(12) United States Patent
Yoshimoto et al.

(10) Patent No.: US 6,487,855 B1
(45) Date of Patent: Dec. 3, 2002

(54) TORQUE CONVERTER

(75) Inventors: Tokuji Yoshimoto; Seiji Makita, both of Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 41 days.

(21) Appl. No.: 09/704,729

(22) Filed: Nov. 3, 2000

(30) Foreign Application Priority Data

| Nov. 11, 1999 | (JP) | ............................................. | 11-320905 |
| Nov. 11, 1999 | (JP) | ............................................. | 11-320906 |
| Nov. 30, 1999 | (JP) | ............................................. | 11-340827 |
| Nov. 30, 1999 | (JP) | ............................................. | 11-340828 |

(51) Int. Cl.$^7$ ............................................. F16D 33/00
(52) U.S. Cl. ......................................... 60/365; 60/367
(58) Field of Search .......................... 60/343, 365, 367

(56) References Cited

U.S. PATENT DOCUMENTS 3,180,095 A * 4/1965 Schneider .................... 60/434

FOREIGN PATENT DOCUMENTS

JP 7-33861 4/1995

* cited by examiner

*Primary Examiner*—Edward K. Look
*Assistant Examiner*—Michael Leslie
(74) *Attorney, Agent, or Firm*—Arent Fox Kintner Plotkin & Kahn, PLLC

(57) ABSTRACT

A torque converter includes a pump impeller, a turbine impeller, a stator impeller disposed between the pump impeller and the turbine impeller, and a free wheel which is interposed between the stator impeller and a stationary case and operable to lock the stator impeller in order to allow the stator impeller to bear a reaction force generated with the amplification of torque between the pump and turbine impellers. In this torque converter, a stator shaft connected to the stator impeller is disposed with its tip end being passed through a turbine shaft to protrude outside the turbine shaft. The free wheel is interposed between the tip end of the stator shaft and the stationary case. Thus, it is possible to reduce the diameter of the stator impeller and thus, the diameter of the entire torque converter, irrespective of the presence of the free wheel inhibiting the rotation of the stator impeller.

12 Claims, 15 Drawing Sheets

TORQUE CONVERTER

BACKGROUND OF THE INVENTION

1. Field of the Invention

The present invention relates to an improvement in a torque converter, comprising a pump impeller connected to a driving shaft, a turbine impeller connected to a turbine shaft, a stator impeller disposed between the pump impeller and the turbine impeller, and a free wheel which is interposed between the stator impeller and a stationary structure and operable to lock the stator impeller in order to allow the stator impeller to bear a reaction force generated with the amplification of torque between the pump and turbine impellers.

2. Description of the Related Art

In such a conventional torque converter, a cylindrical stationary shaft is disposed on an outer periphery of a turbine shaft and surrounded by a boss of a stator impeller, and a free wheel is interposed between the stationary shaft and the boss of the stator impeller, as disclosed in Japanese Patent Publication No.7-33861, for example.

In the torque converter including the free wheel interposed between the boss of the stator impeller and the cylindrical stationary shaft surrounded by the boss, the following problem is encountered: the size of the diameter of the stator impeller and thus, the diameter of the entire torque converter, is necessarily increased due to the concentric disposition of the stator impeller and the free wheel.

SUMMARY OF THE INVENTION

Accordingly, it is an object of the present invention to provide a torque converter of the above-described type, wherein a reduction of the diameter of the entire torque converter can be achieved, despite of the presence of the free wheel.

To achieve the above object, according to a first aspect and feature of the present invention, there is provided a torque converter comprising a pump impeller connected to a driving shaft, a turbine impeller connected to a turbine shaft, a stator impeller disposed between the pump impeller and the turbine impeller, and a free wheel which is interposed between the stator impeller and a stationary structure and operable to lock the stator impeller in order to allow the stator impeller to bear a reaction force generated with the amplification of torque between the pump and turbine impellers, wherein the stator shaft connected to the stator impeller is disposed with a tip end thereof being passed through the turbine shaft to protrude outside the turbine shaft, the tip end of the stator shaft being connected to the stationary structure through the free wheel.

The stationary structure and the driving shaft correspond to a crankcase 1 and a crankshaft 2 in each of embodiments of the present invention, respectively, which will be described hereinafter.

With the first feature, the tip end of the stator shaft passed through the turbine shaft to protrude outside of the turbine shaft is connected to the stationary structure. Therefore, the stator shaft may be merely connected to the stator impeller and hence, it is possible to reduce the diameter of the stator impeller and thus, the diameter of the entire torque converter, irrespective of the presence of the free wheel. Moreover, in a coupled state in which the stator impeller is rotated along with the pump impeller and the turbine impeller, the stator shaft connected to the stator impeller is rotated at substantially the same speed as the driving shaft and the turbine shaft. Therefore, a difference in relative rotational speeds between adjacent ones of the driving shaft, the turbine shaft and the stator shaft is extremely small and hence, the load of each of bearings for these shafts is alleviated, whereby an enhancement in durability thereof can also be provided.

According to a second aspect and feature of the present invention, in addition to the first feature, the turbine impeller is disposed at a location displaced from the pump impeller toward a case carrying the driving shaft; the turbine shaft protruding toward the case is secured to the turbine impeller; the free wheel is interposed between the tip end of the stator shaft passed through the turbine shaft and the case; and the turbine shaft is provided with a driving gear of a primary reducing device, which connects the turbine shaft and an input shaft of a transmission to each other between the turbine impeller and the free wheel.

With the second feature, the driving gear of the primary reducing device can be disposed as close to the case as possible, while avoiding an interference with the free wheel. Therefore, during operation of the primary reducing device, it is possible to suppress a bending moment exerted to the driving shaft by the driving gear to a small level to enhance the durability of the driving shaft.

According to a third aspect and feature of the present invention, in addition to the first or second feature, the stator shaft is relatively rotatably carried on the driving shaft, and the free wheel comprises an outer race formed at the tip end of the stator shaft, an inner race relatively rotatably carried on the driving shaft and non-rotatably connected to the case, and a sprag interposed between both of the races.

With the third feature, both of the outer race and the inner race are carried on the driving shaft. Therefore, a high accuracy of concentricity can be provided to the outer and inner races, whereby the operation of the free wheel can always be stabilized.

According to a fourth aspect and feature of the present invention, in addition to the first feature, the pump impeller has a boss carried on the driving shaft with a first bearing interposed therebetween; the stator shaft leading to a boss of the stator impeller is disposed concentrically around an outer periphery of the driving shaft; the turbine impeller has a boss carried on the stator shaft with a second bearing interposed therebetween, and an operating oil is supplied into an oil chamber defined between the pump impeller and the turbine impeller through between the first and second bearings; and the first and second bearings are provided with bi-directional seal means for inhibiting the passing of a fluid such as air from any of the inside and outside of the bearings.

With the fourth feature, the bi-directional seal means inhibits the passing of fluid such as air to each of the bearings from any of the inside and outside of each bearing. Therefore, when the hydraulic pressure supplied to the torque converter is low, it is possible to inhibit the outside air from entering the inside of the torque converter through the first and second bearings, despite the acceleration of the rotation of the pump impeller, thereby preventing a reduction in transmitting efficiency due to the incorporation of the air into the operating oil. When the hydraulic pressure supplied to the torque converter is raised, such hydraulic pressure can be inhibited from leaking to the outside through the first and second bearings, thereby maintaining the internal hydraulic pressure in the torque converter at a high level to enhance the transmitting efficiency. Thus, it is possible to ensure a high transmitting efficiency, irrespective of the level of the hydraulic pressure supplied.

According to a fifth aspect and feature of the present invention, in addition to the first feature, the pump impeller and the turbine impeller have core rings relatively rotatably lapped on a core ring of the stator impeller, and a lap gap g between adjacent ones of the core rings and an inner circumferential radius R of the core ring of the stator impeller are set to have a relation of $g/R \leq 1.0\%$.

With the fifth feature, when the oil within the torque converter is passed from the turbine impeller through the stator impeller toward the pump impeller during the amplification of torque, a relatively large difference in pressure is generated between an inlet and an outlet of the stator impeller. However, the lap gap between adjacent ones of the core rings exhibits a large throttling resistance under the establishment of $g/R \leq 1.0\%$ and hence, it is possible to effectively inhibit the flowing-out of the oil from the turbine impeller into an in-core oil chamber and the flowing-in of the oil from the in-core oil chamber into the pump impeller, thereby effectively preventing reductions in transmitting efficiency and torque ratio in the torque converter.

According to a sixth aspect and feature of the present invention, in addition to the first feature, the pump impeller and the turbine impeller have core rings relatively rotatably lapped on a core ring of the stator impeller, and a lap margin A between adjacent ones of the core rings and an axial maximum width W of the stator impeller are set to have a relation of $A/W \geq 7.5\%$.

With the sixth feature, a large throttling resistance can be provided to the lap gap between adjacent ones of the core rings under the establishment of $A/W \geq 7.5\%$ and hence, it is possible to effectively inhibit the flowing-out and flowing-in of the oil to effectively prevent reductions in transmitting efficiency and torque ratio in the torque converter.

According to a seventh aspect and feature of the present invention, in addition to the first feature, the pump impeller and the turbine impeller have core rings relatively rotatably lapped on a core ring of the stator impeller, and an annular seal member is interposed between opposed surfaces of adjacent ones of the core rings.

With the seventh feature, the lap gap between adjacent ones of the core rings is sealed by the annular seal member. Therefore, it is possible to reliably inhibit the flowing-out and flowing-in of the oil through the gaps, thereby reliably preventing reductions in transmitting efficiency and torque ratio in the torque converter.

According to an eighth aspect and feature of the present invention, in addition to the first feature, the pump impeller and the turbine impeller have bosses opposed to opposite sides of a boss of the stator impeller; a supply oil passage leading to an oil pump is provided to communicate with an inner periphery of the boss of the stator impeller; an oil outlet is provided in an oil chamber defined behind the turbine impeller to communicate between the pump impeller and the turbine impeller; a gap between the bosses of the turbine impeller and the stator impeller is substantially closed; and an oil inlet is provided in at least one of the bosses of the pump impeller and the stator impeller to permit the inner periphery of the boss of the stator impeller to communicate with an outlet of the stator impeller.

With the eighth feature, when there is a large difference in pressure generated between the inlet and outlet of the stator impeller, even if the pressure discharged from the oil pump is dropped remarkably, the entire amount of the oil discharged by the oil pump is supplied through the oil inlet to the outlet of the stator impeller. Thus, it is possible to effectively inhibit a reduction in pressure in such outlet and to prevent the generation of bubbles in the oil. On the other hand, the oil exiting the turbine impeller cannot flow out between the bosses of the turbine impeller and the stator impeller, and the entire amount of such oil can be passed through the stator impeller. Thus, reductions in torque ratio and transmitting efficiency are inhibited.

According to a ninth aspect and feature of the present invention, in addition to the eighth feature, the oil inlet is comprised of a gap between the bosses of the pump impeller and the stator impeller, which gap is larger than the throttled gap between the bosses of the turbine impeller and the stator impeller.

With the ninth feature, it is possible to contribute to preventing reductions in torque ratio and transmitting efficiency by a simple arrangement.

According to a tenth aspect and feature of the present invention, in addition to the eighth feature, the oil inlet is comprised of a radial groove defined in at least one of opposed surfaces of the bosses of the pump impeller and the stator impeller.

Even with the tenth feature, it is possible to simplify the arrangement and prevent reductions in torque ratio and transmitting efficiency.

According to an eleventh aspect and feature of the present invention, in addition to the eighth feature, the oil inlet is comprised of a through-bore provided in the e boss of the pump impeller.

Even with the eleventh feature, it is possible to simplify the arrangement and prevent reductions in torque ratio and transmitting efficiency.

According to a twelfth aspect and feature of the present invention, in addition to any of the eighth to eleventh features, an annular seal member is interposed between opposed surfaces of the boss of the turbine impeller and the stator impeller.

With the twelfth feature, a gap between the turbine impeller and the boss of the stator impeller is sealed by the seal member. Therefore, it is possible to reliably inhibit the flowing-in and flowing-out of the oil through such gap to contribute to the prevention of reductions in torque ratio and transmitting efficiency.

The above and other objects, features and advantages of the invention will become apparent from the following description of the preferred embodiment taken in conjunction with the accompanying drawings.

BRIEF DESCRIPTION OF THE DRAWINGS

FIGS. 1 to 3 show a first embodiment of the present invention, wherein

FIG. 1 is a vertical sectional plan view of a power unit for a motorcycle;

FIG. 2 is an enlarged vertical sectional view of a shifting clutch in the power unit, a torque converter and surrounding portions;

FIG. 3 is an enlarged view of an essential portion shown in FIG. 2;

DESCRIPTION OF THE PREFERRED EMBODIMENTS

Figure 1:
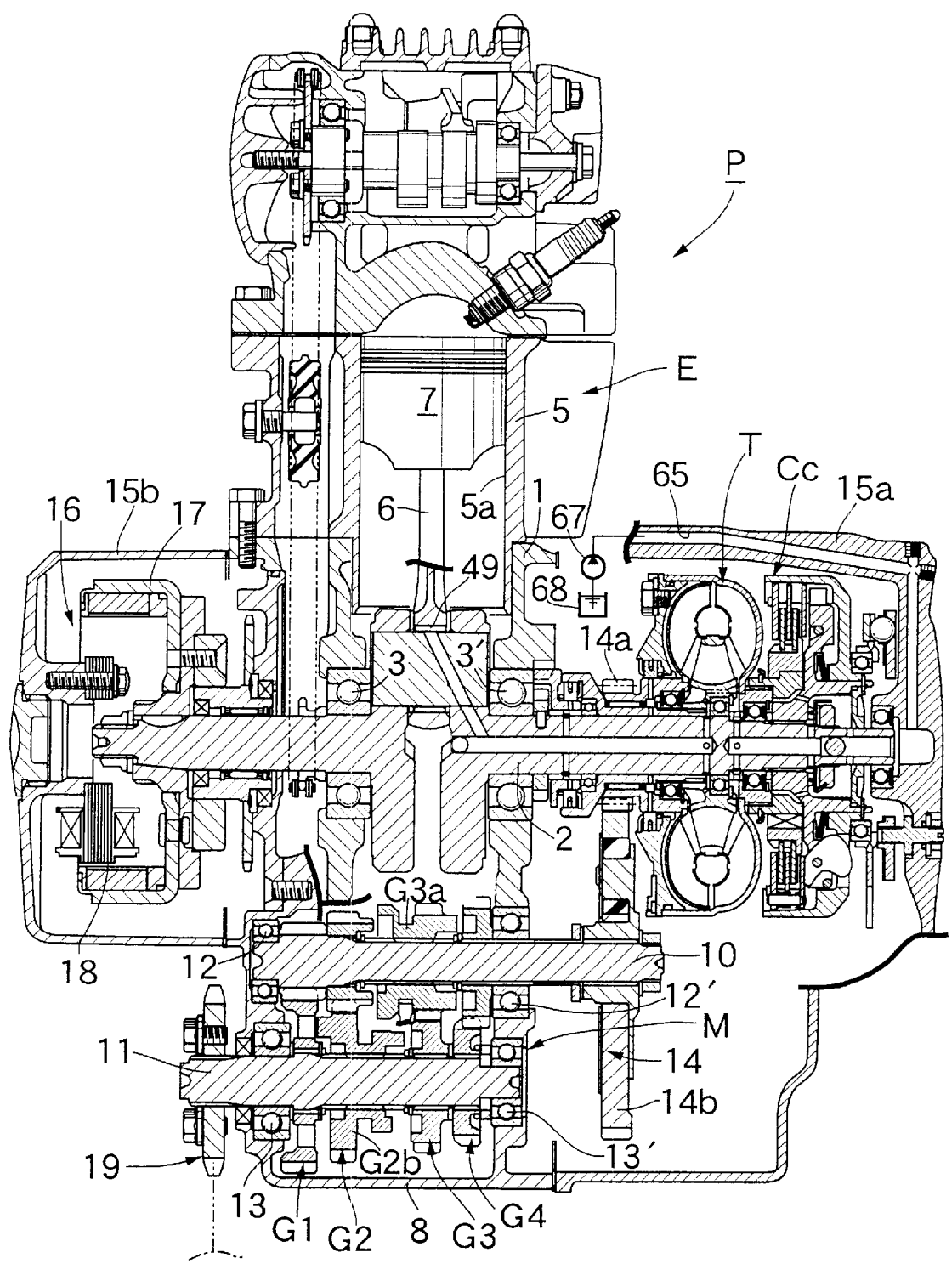

A first embodiment of the present invention will be first described with reference to FIGS. 1 to 3. Referring to FIG. 1, a power unit P for a motorcycle is comprised of an engine E and a multi-stage transmission M, which are provided integrally with each other. The engine E includes a crankshaft 2 carried in a crankcase 1 with a pair of left and right ball bearings 3 and 3' interposed therebetween, as conventionally usual, and a piston 7 slidably received in a cylinder bore 5a in a cylinder block 5 and connected to the crankshaft 2 through a connecting rod 6. The crankshaft 2 is disposed to face in a lateral direction of the motorcycle.

A transmission case 8 is integrally connected to the crankcase 1, and an input shaft 10 and an output shaft 11 of the multi-stage transmission M are disposed in parallel to the crankshaft 2 and carried on left and right opposite sidewalls of the transmission case 8 with ball bearings 12, 12'; 13, 13' interposed therebetween. A first-shift gear train G1, a second-shift gear train G2, a third-shift gear train G3 and a fourth-shift gear train G4 are disposed on the input shaft 10 and the output shaft 11 sequentially from a left side as viewed in FIG. 1. A driven gear G2b of the second-shift gear train G2 and a driving gear G3a of the third-shift gear train G3 serve as shifting gears, respectively. When both of the shifting gears G2b and G3a are in neutral positions, the transmission M is in a neutral state. When the shifting gear G2b is moved leftwards or rightwards as viewed in FIG. 1, the first-shift gear train G1 or the third-shift gear train G3 is established. When the shifting gear G3a is moved leftwards or rightwards, the second-shift gear train G2 or the fourth-shift gear train G4 is established. The shifting gears G2b and G3a are operated by a known pedal-operated or manually operated changing device which is not shown.

A right end of the crankshaft 2 and a right end of the input shaft 10 of the transmission M are connected to each other through a shifting clutch Cc, a torque converter T and a primary reducing device 14 which are connected in series to one another outside the crankcase 1 and the transmission case 8. In this case, particularly, the shifting clutch Cc, the torque converter T and a driving gear 14a of the primary reducing device 14 are mounted on the crankshaft 2 in an order of the driving gear 14a, the torque converter T and the shifting clutch Cc from the side of the right sidewall of the crankcase 1 toward the outside. A right side cover 15a is coupled to right end surfaces of the crankcase 1 and the transmission case 8 to cover the driving gear 14a, the torque converter T and the shifting clutch Cc.

A rotor 17 of a generator 16 is secured to a left end of the crankshaft 2, and a stator 18 of the generator 16 is mounted to a left side cover 15b, which is coupled to a left end surface of the crankcase 1 to cover the generator 16.

A chain-type finally reducing device 19 for driving a rear wheel (not shown) of the motorcycle is connected to a left end of the output shaft 11 of the transmission M outside the transmission case 8.

Figure 2:
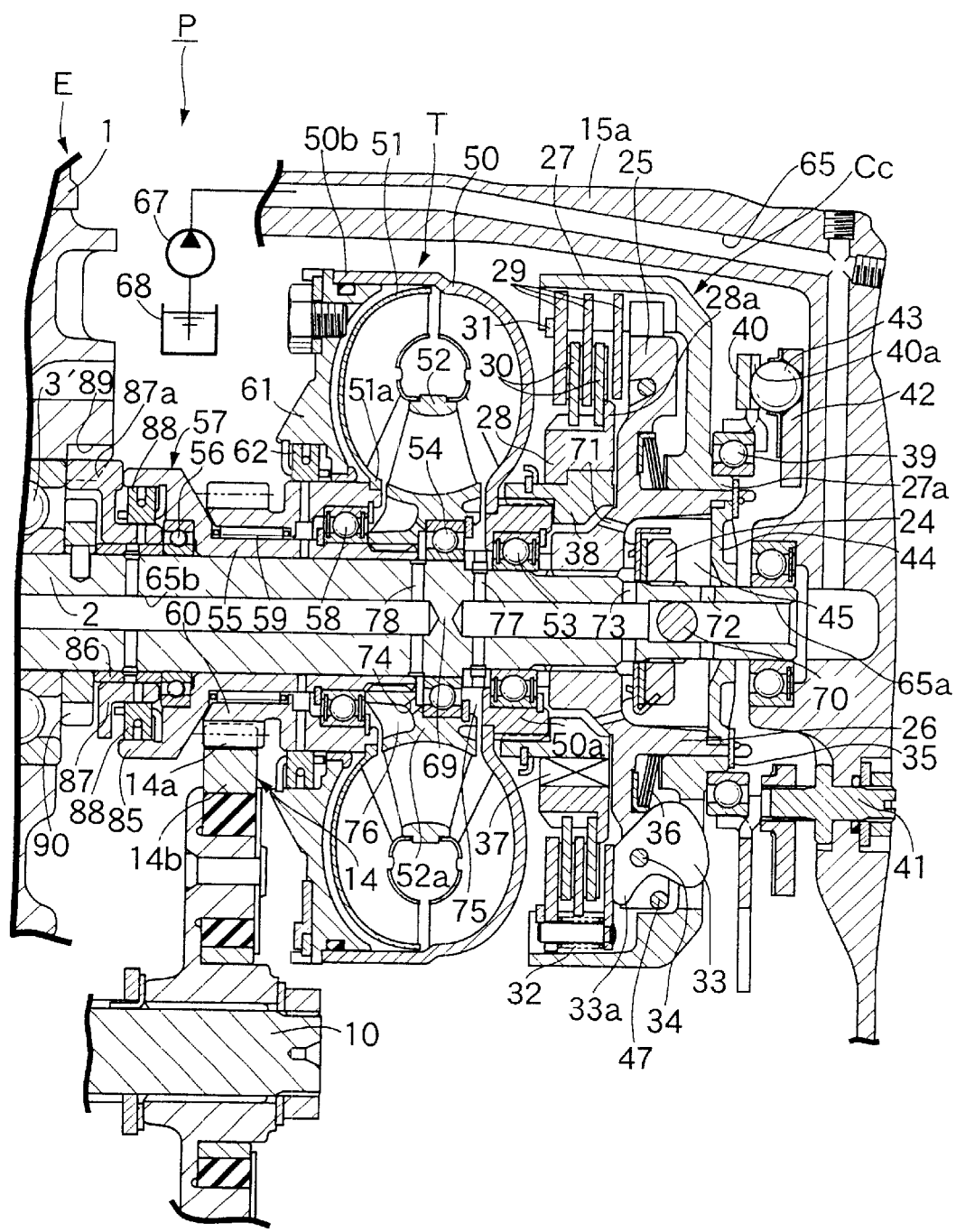

As shown in FIGS. 1 and 2, the shifting clutch Cc includes a driving plate 25 spline-coupled to the crankshaft 2, and a bottomed cylindrical clutch outer 27 slidably carried on a support tube 26 which is integrally provided on an outer surface of the driving plate 25 to protrude therefrom. The driving plate 25 is disposed adjacent an end wall of the clutch outer 27 and has an outer periphery spline-coupled to an inner periphery of the clutch outer 27. A clutch inner 28 is coaxially disposed within the clutch outer 27. A plurality of annular driving friction plates 29 are slidably spline-engaged with an inner periphery of a cylindrical portion of the clutch outer 27, and a plurality of annular driven friction plates 30 are slidably engaged with an outer periphery of the clutch inner 28, in such a manner that the annular driving friction plates 29 and the annular driven friction plates 30 are disposed in an alternately laminated relation. In this case, two driving friction plates 29 are disposed inside and outside the groups of the friction plates 29 and 30, respectively, and a receiving ring 31 opposed to an outer surface of the outermost driving friction plate 29 is locked to the inner periphery of the cylindrical portion of the clutch outer 27.

A spacing spring 32 is mounted under compression between the opposite-side driving friction plates 29 for biasing these driving friction plates 29 away from each other. A flange 28a projectingly provided on the outer periphery of the clutch inner 28 is opposed to the innermost driven friction plate 30.

A plurality of centrifugal weights 33 are swingably mounted to the driving plate 25 by pivots 34, so that an urging arm 33a of each of the centrifugal weights 33 can urge the innermost driving friction plate 29. The support tube 26 of the driving plate 25 is provided with a stopper 35 defining a limit of outward (rightward as viewed in FIG. 2) sliding movement of the clutch outer 27, and a clutch spring 36 is mounted between the driving plate 25 and the clutch outer 27 for biasing the clutch outer 27 toward the stopper 35.

An annular transmitting member 38 is connected to the clutch inner 28 through a known reverse load transmitting screw mechanism 37 and spline-coupled to an outer periphery of a boss 50a of a pump impeller 50 of the torque converter T.

The clutch outer 27 has a boss 27a protruding on its outer surface, and a release cam 40 is mounted to the boss 27a with a release bearing 39 interposed therebetween. A stationary cam 42 mounted to a right side cover 15a through a regulating bolt 41 is opposed to the release cam 40, and a ball 43 mounted on the stationary cam 42 is engaged in a recess 40a in the release cam 40.

The release cam 40 is turned by a clutch arm (not shown) operated prior to a shifting.

As likewise shown in FIGS. 1 and 2, the torque converter T includes a pump impeller 50 and a turbine impeller 51, which are disposed in an opposed relation to each other, as conventionally usual, and a stator impeller 52 disposed so that it is interposed between the impellers 50 and 51. The pump impeller 50 is rotatably disposed in such a manner that an outer periphery of a boss 50a thereof is spline-coupled to the transmitting member 38, and an inner periphery of the boss 50a is rotatably carried on an outer peripheral surface of the crankshaft 2 with a ball bearing 53 interposed therebetween.

The turbine impeller 51 is disposed at a location displaced from the pump impeller 50 toward the crankcase 1, and a cylindrical turbine shaft 60 is secured to a boss 51a of the turbine impeller 51 to protrude toward the crankcase 1, and is concentrically disposed around an outer periphery of the crankshaft 2.

The stator impeller 52 has a boss 52a rotatably carried on the outer peripheral surface of the crankshaft 2 with a ball bearing 54 interposed therebetween. The boss 52a is spline-coupled to one end of a stator shaft 55, which is concentrically disposed around the outer periphery of the crankshaft 2. The other end of the stator shaft 55 extends near the right sidewall of the crankcase 1, and is rotatably carried on the crankshaft 2 with a ball bearing 56 interposed therebetween, and is connected to the crankcase 1 through a free wheel 57.

The turbine shaft 60 is rotatably carried at its inner and outer ends on the outer peripheral surface of the stator shaft 55 with a ball bearing 58 and a needle bearing 59 interposed therebetween.

The free wheel 57 is comprised of a cup-shaped outer race 85 formed at an outer end of the stator shaft 55 at a diameter larger than the outside diameter of the stator shaft 55, an inner race 87 relatively rotatably carried on the crankshaft 2 within the outer race 85 with a bearing bush 86 interposed therebetween, and a sprag 88 interposed between both of the races 85 and 87. The inner race 87 has a stationary arm 87a projectingly provided at one end thereof to fix the inner race 87 and engaged in an engage groove 89, which is defined in an outer wall of the crankcase 1 at a location adjacent the stationary arm 87a. The sprag 88 is arranged, so that when the outer race 85 is about to be rotated in a direction opposite from a direction of rotation of the pump impeller 50, the sprag locks the outer race 85 to the inner race 87, but permits the rotation of the outer race 85 in the same direction as the direction of rotation of the pump impeller 50.

An oil pump driving gear 90 is keyed to the crankshaft 2 at a location radially inside the stationary arm 87a, so that an oil pump 67 which will be described hereinafter is driven by the gear 90.

A torque converter side cover 61 is oil-tightly coupled to a pump extension 50b connected to the pump impeller 50 to surround the turbine impeller 51, and covers the exterior of the turbine impeller 51. A one-way clutch 62 is interposed between the torque converter side cover 61 and the turbine shaft 60 to transmit only a reverse load torque from the turbine shaft 60 to the torque converter side cover 61.

A driving gear 14a is integrally formed at the outer end of the turbine shaft 60, and a driven gear 14b meshed with the driving gear 14a is spline-coupled to the input shaft 10 of the transmission M. The primary reducing device 14 formed in the above manner is disposed between the free wheel 57 and the torque converter T.

Provided in the crankshaft 2 are an upstream supply oil passage 65a which opens into a right end surface of the crankshaft 2, and a downstream supply oil passage 65b communicating with the needle bearing 49 around an outer periphery of a crank pin which supports a larger end of the connecting rod 6. An oil pumped from an oil reservoir 68 by the oil pump 67 driven by the oil pump driving gear 90 is fed to the upstream supply oil passage 65a through an oil passage 65 defined in the right side cover 15a. The oil reservoir 68 is defined in bottoms of the crankcase 1, the transmission case 8 and the right side cover 15a.

The crankshaft 2 is provided with a partition wall 69 which partitions the upstream and downstream supply oil passages 65a and 65b from each other, and a partition plug 70 is incorporated in the upstream supply oil passage 65a for dividing the upstream supply oil passage 65a into an upstream portion and a downstream portion.

In the shifting clutch Cc, an oil chamber 45 is defined in the support tube 26 by closing an opened surface of the support tube 26 by a lid 44, and communicates with an inner periphery of the clutch inner 28 through a through-bore 71. The oil chamber 45 communicates with the upstream and downstream portions of the upstream supply oil passage 65a through an inlet bore 72 and an outlet bore 73 provided in the crankshaft 2.

Figure 3:
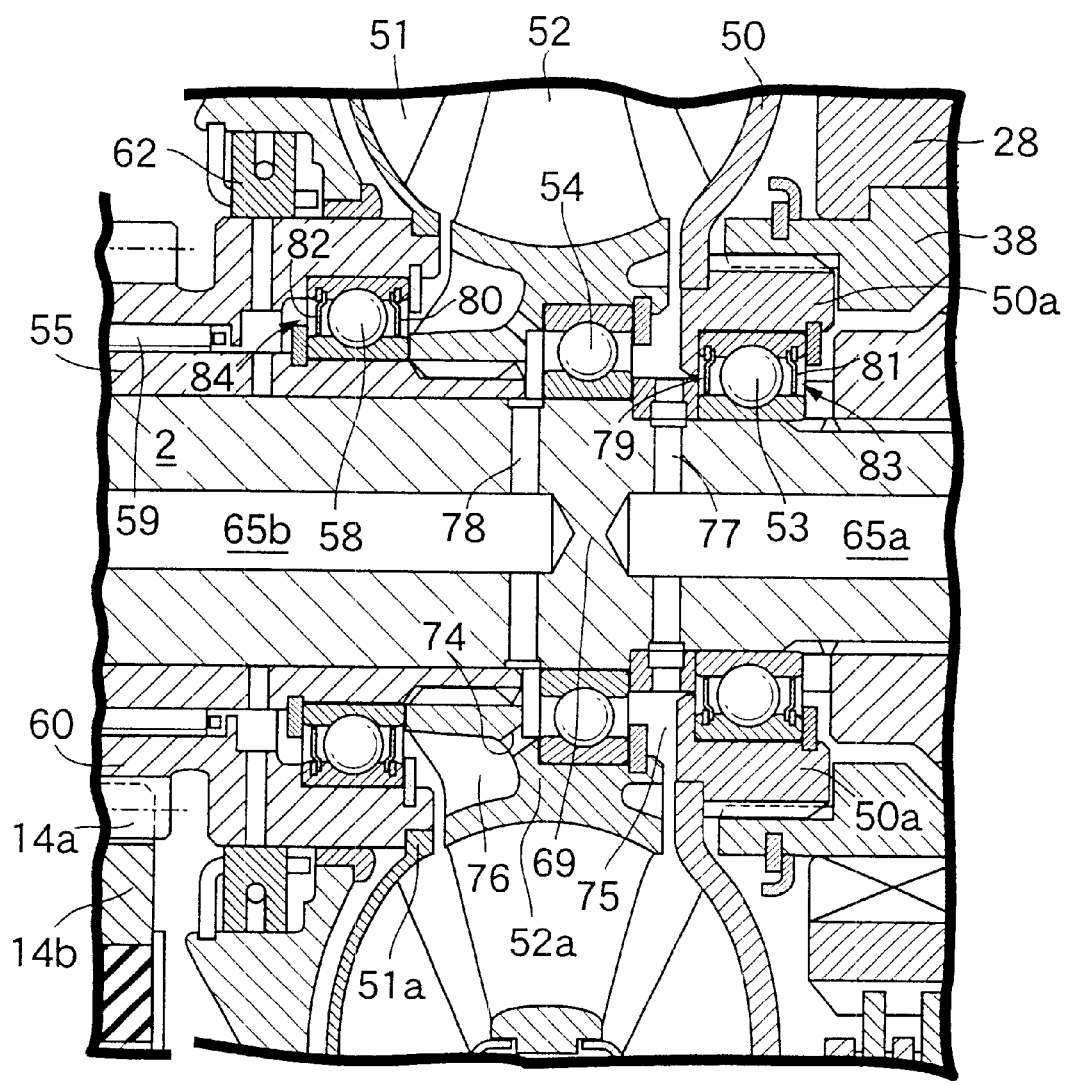

As best shown in FIG. 3, first and second small oil chambers 75 and 76 are provided on the right and left of the boss 52a of the stator impeller 52, respectively. The first small oil chamber 75 communicates with an oil chamber defined between the pump impeller 50 and the turbine impeller 51 and also communicates with the downstream portion of the upstream supply oil passage 65a through an inlet bore 77 provided in the crankshaft 2. The second small oil chamber 76 communicates with an oil chamber defined between the turbine impeller 51 and the stator impeller 52 and also communicates with the downstream supply oil passage 65b through the through-bore 74 in the boss 52a and an outlet bore 78 provided in the crankshaft 2.

The ball bearing 53 (which will be referred to as a first bearing hereinafter) supporting the boss 50a of the pump impeller 50 adjoins the first small oil chamber 75, and the ball bearing 58 (which will be referred to as a second bearing hereinafter) supporting the boss 51a of the turbine impeller 51 adjoins the second small oil chamber 76. Inner seal members 79 and 80 are mounted inside the first and second bearings 53 and 58 respectively for inhibiting the passage of a fluid from the inside to the outside of the first and second bearings 53 and 58, and outer seal members 81 and 82 are mounted outside the first and second bearings 53 and 58 respectively for inhibiting the passage of a fluid such as air from the outside to the inside of the first and second bearings 53 and 58. The inner and outer seal members 79 and 81; 80 and 82 form bi-directional seal means 83 and 84 of the present embodiment, respectively.

In addition, the ball bearing 54 supporting the boss 52a of the stator impeller 52 has a right end surface facing the first small oil chamber 75 and the other end surface communicated with the second small oil chamber 76 through the through-bore 74.

The operation of the present embodiment will be described below.

First, the description of the operation of the shifting clutch Cc will be started. During idling of the engine E, the rotational speed of the driving plate 25 rotated along with the crankshafts 2 is low and the centrifugal force of weight portions of the centrifugal weights 33 is small and hence, the urging force of the urging arms 33a to the driving friction plates 29 is also small. For this reason, the opposite-side driving friction plates 29 are spaced apart from each other under the action of the biasing force of the spacing spring 32, so that the driven friction plates 30 are released, whereby the shifting clutch Cc is in its turned-off state. Therefore, the shifting clutch Cc in the turned-off state cuts off the transmission of a power from the crankshaft 2 to the torque converter T and hence, it is possible to prevent the forward movement of the vehicle at a very slow speed due to a creep phenomenon of the torque converter T without operation of a wheel brake.

When the rotational speed of the engine E is increased to a level equal to or higher than a predetermined value, the centrifugal force of the weight portions of the centrifugal weights 33 is increased with the increase in rotational speed of the engine E, whereby the urging arms 33a urge the groups of the driving and driven friction plates 29 and 30 strongly against the receiving ring 31 to bring the driving and driven friction plates 29 and 30 into frictional engagement with one another. Therefore, the shifting clutch Cc is automatically brought into its turned-on state, whereby the power of the crankshaft 2 is transmitted from the clutch inner 28 through the transmitting member 38 to the torque converter T.

When the urging force of the centrifugal weights 33 to the groups of the driving and driven friction plates 29 and 30 exceeds a set load of the clutch spring 36, the clutch outer 27 is displaced leftwards as viewed in FIG. 2, while flexing the clutch spring 36. Moreover, the centrifugal weights 33 are received by the stopper ring 47 mounted on the clutch outer 27, so that the further outward swinging movement thereof is inhibited. The force of pressure contact of the driving and driven friction plates 29 and 30 with one another is not increased to a level equal to or larger than the load of the clutch spring 36.

In switching over the transmission M, when the release cam 40 is turned by a clutch lever (not shown) prior to such switching-over, the release cam 40 urges the ball 43 on the stationary cam 42 out of the recess 40a, and the resulting reaction force pushes the clutch outer 27 leftwards as viewed in FIG. 2 through the release bearing 39 against the load of the clutch spring 36, whereby the receiving ring 31 is spaced apart from the groups of the driving and driven friction plates 29 and 30. On the other hand, the centrifugal weights 33 are inhibited from being swung outwards by the stopper ring 47 as described above and hence, the urging arms 33a are stopped at the urging position assumed hitherto for the groups of the driving and driven friction plates 29 and 30. Therefore, the driving and driven friction plates 29 and 30 are reliably spaced apart from one another, whereby the shifting clutch Cc is turned off.

In this state, the switching-over of the transmission M can be conducted lightly without being influenced by the driving torque of the crankshaft 2.

If the release cam 40 is returned to its original position by the clutch arm after the switching-over of the transmission M, the shifting clutch Cc is restored to its turned-on state by cooperation of the biasing force of the clutch spring 36 with the continued centrifugal force of the centrifugal weights 33 to transmit the driving torque of the crankshaft 2 to the torque converter T.

Secondly, the operation of the torque converter T will be described below.

When the oil pump 67 driven by the engine E supplies the oil to the upstream supply oil passage 65a through the oil passage 65, the oil is permitted to flow through the inlet bore 72 into the oil chamber 45 and then diverted into the through-bore 71 and the outlet bore 73. The oil passed through the through-bore 71 is supplied to frictional portions and sliding portions of the shifting clutch Cc to contribute to the cooling and lubrication of them.

On the other hand, the oil passed through the outlet bore 73 is passed through the downstream portion of the upstream supply oil passage 65a and then through the inlet bore 77 via the first small oil chamber 75 to the oil chamber defined between the pump impeller 50 and the turbine impeller 51 to fill such oil chamber. Then, the oil flows via the second small oil chamber 76, the through-bore 74 and the outlet bore 78 to the downstream supply oil passage 65b, whereby it is put into the lubrication of various portions of the engine E.

Thus, when the output torque from the crankshaft 2 is transmitted to the pump impeller 50 through the shifting clutch Cc which is in the turned-on state, such torque is hydraulically transmitted to the turbine impeller 51 by the action of the oil filling the inside of the torque converter T. If a torque amplifying action has been produced between both of the impellers 50 and 51 at that time, the resulting reaction force is borne by the stator impeller 52, and the stator impeller 52 is fixedly supported on the crankcase 1 by a locking action of the free wheel 57. When the rotational speed of the turbine impeller 51 approaches the rotational speed of the pump impeller 50 to reach a coupled state, the stator impeller 52 is rotated along with the pump impeller 50 and the turbine impeller 51 under a racing action of the free wheel 57, thereby enhancing the transmitting efficiency in the coupled state.

The torque transmitted from the pump impeller 50 to the turbine impeller 51 is transmitted through the primary reducing device 14 to the input shaft 10 of the transmission M and then sequentially via the shifting gears G1, G2, G3, G4 selectively established, the output shaft 11 and the finally reducing device 19 to the rear wheel (not shown) to drive the rear wheel.

Upon an engine brake during traveling of the vehicle, the one-way clutch 62 is brought into a connected state by application of the reverse load torque to the turbine shaft 60, whereby the reverse load torque is transmitted from the pump extension 50b to the pump impeller 50 and the transmitting member 38. When the reverse load torque has been transmitted to the transmitting member 38, the clutch inner 28 in the shifting clutch Cc is pushed leftwards as viewed in FIG. 2 by the operation of the screw mechanism 37, whereby the flange 28a thereof urges the groups of the driving and driven friction plates 29 and 30 against the receiving ring 31, leaving the innermost driving friction plate 29 and hence, the shifting clutch Cc is brought into its turned-on state. Therefore, the reverse load torque is transmitted to the crankshaft 2, thereby providing a good engine brake effect.

The free wheel 57 connecting the stator impeller 52 to the crankcase 1 which is a stationary structure, is interposed between the outer end of the stator shaft 55 protruding through the turbine shaft 60 to the outside of the turbine shaft 50 and a portion of the crankcase 1 adjoining such outer end. Therefore, the inner end of the stator shaft 55 may be merely connected to the boss 52a of the stator impeller 52 and hence, it is possible to reduce the diameter of the stator impeller 52 and thus, the diameter of the entire torque converter T, despite of the presence of the free wheel 57. The boss 52a of the stator impeller 52 can be carried stably on the crankshaft 2 with the bearing 54 interposed therebetween, despite of the presence the free wheel 57. Moreover, opposite end surfaces of the bearing 54 face the first and second small oil chambers 75 and 76 on the opposite sides of the boss 52a and hence, the bearing 54 can always be put in a good lubricated state.

When the stator shaft 55 connected to the stator impeller 52 is in its coupled state in which the stator impeller 52 is rotated along with the pump impeller 50 and the turbine impeller 51, it is rotated at substantially the same speed as the crankshaft 2 and the turbine shaft 60. Therefore, differences in relative rotational speed among the three shafts 2, 55 and 60 are extremely small, and the loads of the bearings 54, 56, 58 and 59 among these shafts are alleviated, whereby an enhancement in durability thereof can be provided.

The turbine shaft 60 protruding toward the crankcase 1 is secured to the turbine impeller 51 disposed at the location displaced from the pump impeller 50 toward the crankcase 1, and the driving gear 14a of the primary reducing device 14 located between the turbine impeller 51 and the free wheel 57 is formed at the outer end of the turbine shaft 60. Therefore, the driving gear 14a can be disposed as close to the crankcase 1 as possible, while avoiding the interference with the free wheel 57 and hence, it is possible to suppress a bending moment exerted to the crankshaft 2 by the driving gear 14a to a small level during the operation of the primary reducing device 14 to enhance the durability of the crankshaft 2.

Further, the free wheel 57 is comprised of the outer race 85 formed at the outer end of the stator shaft 55 carried on the crankshaft 2 with the bearing 56 interposed therebetween, the inner race 87 relatively rotatably carried on the crankshaft 2 and non-rotatably connected to the crankcase 1, and the sprag 88 interposed between both of the races 85 and 87. Therefore, both of the outer race 85 and the inner race 87 are carried on the crankshaft 2, and a high accuracy of concentricity can be provided to the outer race 85 and the inner race 87 to ensure the stable operation of the free wheel 57.

The boss 52a of the stator impeller 52 is carried on the crankshaft 2 with the bearing 54 interposed therebetween and hence, a stable rotation can be ensured. Moreover, the opposite end surfaces of the bearing 54 face the first and second small oil chambers 75 and 76 on the opposite sides of the boss 52a and hence, the bearing 54 can always be put in a good lubricated state.

Further, it will be considered that the engine E is in a low-speed rotating region, and the pressure discharged from the oil pump 67 driven by the engine is low and hence, the pressure of oil supplied from the upstream supply oil passage 65a to the torque converter T is low. In this case, when the rotation of the pump impeller 50 is accelerated with the acceleration of the engine E, the pump impeller 50 is about to suck a large amount of oil into the impeller itself, but the supply of the oil from the upstream supply oil passage 65a to the first small oil chamber 75 is not overtaken, and the first and second small oil chambers 75 and 76 may be depressurized in some cases. However, since the fist and second bearings 53 and 58 adjoining these small oil chambers 75 and 76 have the outer seal members 81 and 82 for inhibiting the entrance of fluid such as air from the outside, the air within the right side cover 15a can be prevented from entering the first and second small oil chambers 75 and 76 through the bearings 53 and 58. Therefore, it is possible to prevent a reduction in transmitting efficiency due to the incorporation of the air into the operating oil in the torque converter T.

On the other hand, when a sufficient pressure discharged from the oil pump 67 is provided in a high-speed rotating region of the engine E, the pressures in the first and second small oil chambers 75 and 76 are also raised. However, since the first and second bearings 53 and 58 adjoining the small oil chambers 75 and 76 have the inner seal members 79 and 80 for inhibiting the entrance of the fluid from the inside, the hydraulic pressure in each of the small oil chambers 75 and 76 can be prevented from leaking to the outside through the bearings 53 and 58. Thus, it is possible to reliably maintain a high-pressure state within the torque converter T and to ensure a high transmitting efficiency.

The direct communication between the upstream supply oil passage 65a and the downstream supply oil passage 65b within the crankshaft 2 is cut off by the partition wall 69 between the inlet bore 77 and the outlet bore 78 and hence, the oil supplied from the oil pump 67 to the upstream supply oil passage 65a is obliged to pass through the inside of the torque converter T through the inlet bore 77 and the outlet bore 78. Thus, even if the oil pump 67 is of a relatively small capacity, a shortage of the operating oil in the torque converter T can be prevented to the utmost, which is effective for a small-sized vehicle.

In the first embodiment, the type of the bearing used at each of the portions may be selected as desired, and for example, any of a ball bearing, a needle bearing, a bush bearing and the like may be used. In addition, an orifice may be provided in the crankshaft 2 to permit the communication between the upstream and downstream supply oil passages 65a and 65b, so that a portion of the oil in the upstream supply oil passage 65a may be transferred through the orifice directly to the downstream supply oil passage 65b.

A second embodiment of the present invention shown in FIGS. 4 and 5 will be described below.

Figure 4:
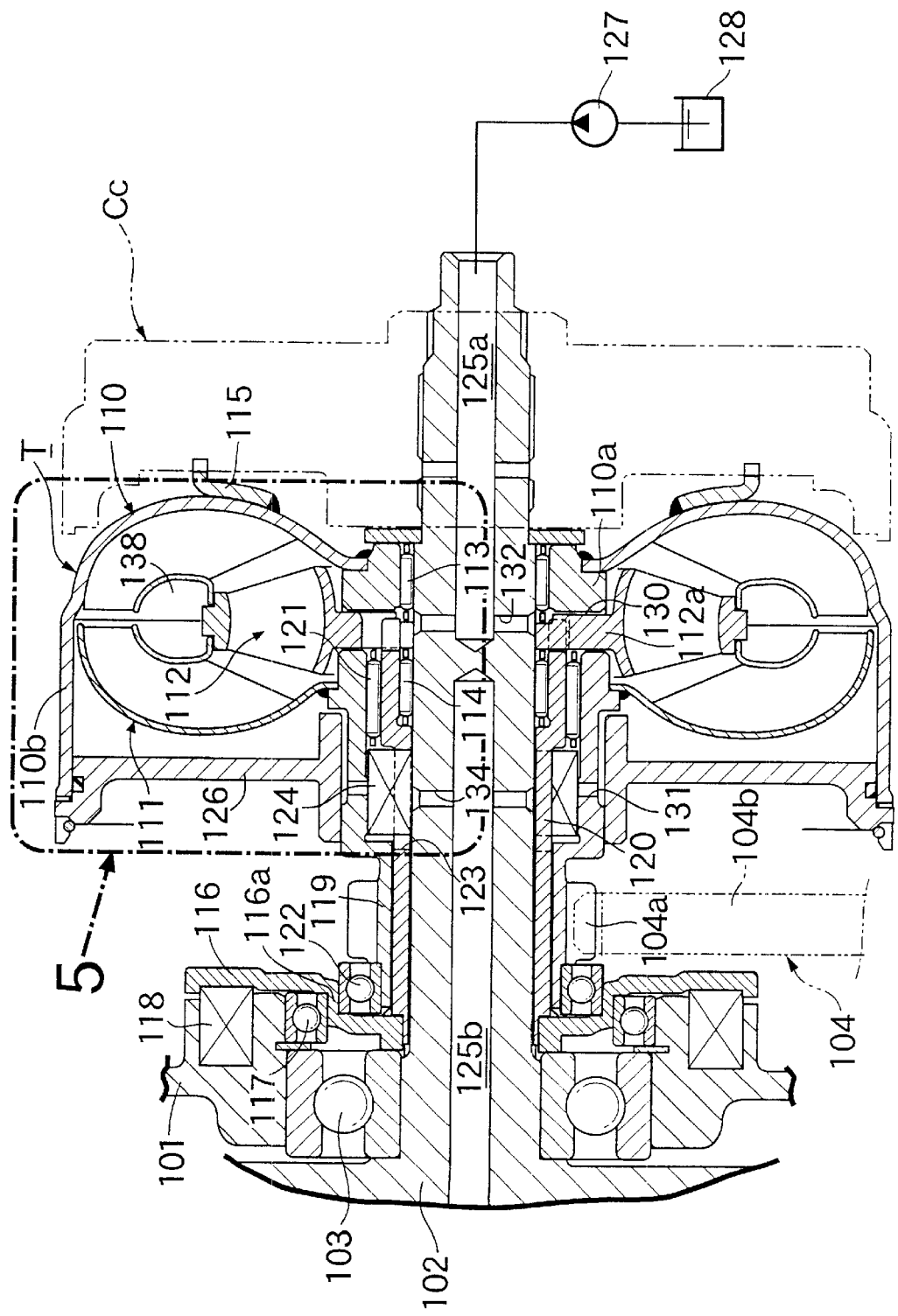
FIG. 4 is a vertical sectional view of a torque converter according to a second embodiment of the present invention.

Referring to FIG.4, a driving gear 104a of a primary reducing device 104, a torque converter T and a shifting clutch Cc are mounted to a crankshaft 102 carried in a crankcase 101 of an engine with a bearing 103 interposed therebetween, sequentially in the named order from the side of a right outer surface of the crankcase 101, so that an output from the crankshaft 102 is transmitted through the shifting clutch Cc, the torque converter T and the primary reducing device 104 to an input shaft of a multi-stage transmission (not shown).

Figure 5:
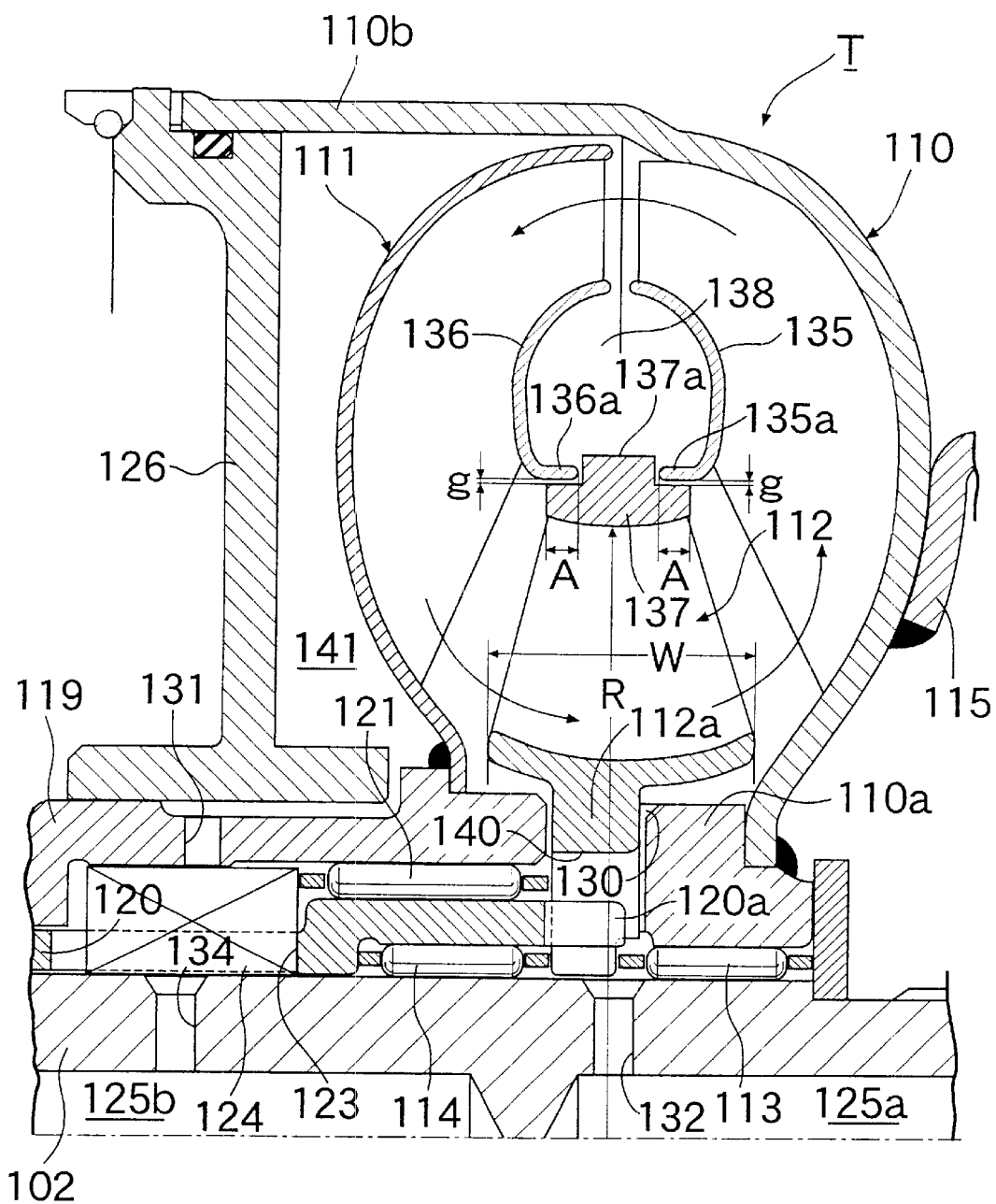
FIG. 5 is an enlarged view of a portion indicated by 5 in FIG. 4.

As shown in FIGS. 4 and 5, the torque converter T is comprised of a pump impeller 110, a turbine impeller 111 and a stator impeller 112. The pump impeller 110 is disposed adjacent the shifting clutch Cc and has a boss 110a carried on the crankshaft 102 with a needle bearing 113 interposed therebetween. A transmitting plate 115 engaged with an output portion of the shifting clutch Cc is secured to an outer surface of the pump impeller 110. Therefore, an output torque from the shifting clutch Cc is transmitted through the transmitting plate 115 to the pump impeller 110. At the switching-over of the multi-stage transmission (not shown), the shifting clutch Cc is controlled into its turned-off state to avoid a shifting shock.

A cylindrical stator shaft 120 is disposed on the crankshaft 102 between the boss 110a of the pump impeller 110 and the ball bearing 103 supporting the crankshaft 102. A dog 120a formed at a right end of the stator shaft 120 is engaged in a notch 140 formed around an inner periphery of the boss 112a of the stator impeller 112. In this manner, the stator shaft 120 is connected to the stator impeller 112.

A left end of the stator shaft 120 is passed through a turbine shaft 119 connected to the turbine impeller 110 to protrude to the outside of the turbine shaft 119, and a stator arm plate 116 is secured to such left end. An outer peripheral surface of a cylindrical portion 116a provided at an intermediate portion of the stator arm plate 116 is carried on the crankcase 101 with a ball bearing 117 interposed therebetween. An outer periphery of the stator arm plate 116 is supported on the crankcase 101 with a free wheel 118 interposed therebetween.

The driving gear 104a of the primary reducing device 104 is integrally formed on the turbine shaft 119, and a driven gear 104b provided on the input shaft of the transmission is meshed with the driving gear 104a. The primary reducing device 104 constructed in the above manner is disposed between the crankcase 101 and the torque converter T.

The turbine impeller 111 opposed to the pump impeller 110 has the turbine shaft 119 integrally provided at its center portion, and is carried at its right end on the stator shaft 120 with a needle bearing 121 interposed therebetween, and at its left end on an inner peripheral surface of the cylindrical portion 116a of the stator arm plate 116 with a ball bearing 122 interposed therebetween. A one-way clutch 124 is mounted between the turbine shaft 119 and the crankshaft 102 to extend through a transverse bore 123 in the stator shaft 120. The one-way clutch 124 is brought into its turned-on state upon application of a reverse load to the turbine shaft 119 to connect the turbine shaft 119 and the crankshaft 102 directly to each other.

The pump impeller 110 includes a pump extension 110b which surrounds the turbine impeller 111, and a side cover 126 is oil-tightly fitted to an opened end of the extension 110b to cover the outer surface of the turbine impeller 111. The side cover 126 is also relatively rotatably fitted over an outer peripheral surface of the turbine shaft 119. An oil chamber 141 is defined between the turbine impeller 111 and the side cover 126 to communicate between the pump impeller 110 and the turbine impeller 111.

Provided in the crankshaft 102 are an upstream supply oil passage 125a which opens into a right end surface of the crankshaft 102, and a downstream supply oil passage 125b connected to portions to be lubricated, which are located around the crankshaft 102. Oil pumped from an oil reservoir 128 by an oil pump 127 driven by the crankshaft 102 is fed to the upstream supply oil passage 125a. The oil reservoir 128 is defined in a bottom of the crankcase 101.

A gap among the boss 110a of the pump impeller 110, the turbine shaft 119 and the boss 112a of the stator impeller 112 serves as a fluid inlet 130 for the torque converter T. A fluid outlet 131 for the torque converter T is provided at a portion of the turbine shaft 119 extending toward the outside of the turbine impeller 111, and communicates with the oil chamber 141. The fluid inlet 130 communicates with the upstream supply oil passage 125a through an inlet bore 132 in the crankshaft t 102, and the fluid outlet 131 communicates with the downstream supply oil passage 125b through the traverse bore 123 in the stator shaft 120 and the outlet bore 134 in the crankshaft 102.

As can be seen from FIG. 5, in the torque converter T, an annular projection 137a is f formed at an axially central location on an outer peripheral surface of a core ring 137 of the stator impeller 112, and inner peripheral ends 135a and 136a of core rings 135 and 136 of the pump impeller 110 and the turbine impeller 111 are disposed to relatively rotatably lap on the outer peripheral surface of the core ring 137 on the opposite sides of the annular projection 137a.

In this case, each of the core rings 135, 136 and 137 are formed, so that the following expressions are established:

$$g/R \leq 1.0\% \quad (1)$$

$$A/W \geq 7.5\% \quad (2)$$

wherein g designates a lap gap between the adjacent ones of the core rings 135, 136 and 137; R is an inner peripheral radius of the core ring 137 of the stator impeller 112; A is a lap margin among the core rings 135, 136 and 137; and W is the axially largest width of the stator impeller 112.

In FIG. 5, reference character 138 designates an annular in-core oil chamber surrounded by the three core rings 135, 136 and 137.

The operation of the second embodiment will be described below.

When the oil pump 127 driven by the crankshaft 102 pumps the oil into the upstream supply oil passage 125a in the crankshaft 102 during operation of the engine, such oil first flows through the inlet bore 132, the notch 140 and the oil inlet 130 into the torque converter T to fill between the pump impeller 110 and the turbine impeller 111 and further fill the oil chamber 141; flows through the oil outlet 131 to the traverse bore 123 to lubricate the one-way clutch 124; and then flows via the outlet bore 134 into the downstream supply oil passage 125b in the crankshaft 102 and thus put into the lubrication of an area around the crankshaft 102. Thus, the oil is replaced by new oil in the torque converter T, whereby the cooling of the torque converter T is achieved.

When the shifting clutch Cc is in its turned-on state, the output torque from the crankshaft 102 is transmitted through the shifting clutch Cc to the pump impeller 110 to rotate the pump impeller 110. The oil within the torque converter T transmits the rotational torque of the pump impeller 110 to the turbine impeller 111, while being circulated within the torque converter T in a course of the pump impeller 110→the turbine impeller 111→the stator impeller 112→the pump impeller 110 by the rotation of the pump impeller 110. If a torque amplifying action has been produced between the pump impeller 110 and the turbine impeller 111 at that time, the resulting reaction force is borne by the stator impeller 112, and the stator impeller 112 is fixedly supported on the crankcase 101 by a locking action of the free wheel 118.

In this case, the pressure of the oil directed from the turbine impeller 111 to the pump impeller 110 is converted into a kinetic energy in the stator impeller 112 and as a result, a relatively large difference in pressure is generated between an inlet and an outlet of the stator impeller 112. Therefore, in the lap gap g between the core ring 136 of the turbine impeller 111 and the core ring 137 of the stator impeller 112, the oil is about to flow out of the turbine impeller 111 into the in-core oil chamber 138, and in the lap gap g between the core ring 135 of the pump impeller 110 and the core ring 137 of the stator impeller 112, the oil in the in-core oil chamber 138 is about to flow into the pump impeller 110.

Such flowing-in and flowing-out of the oil cause reductions in transmitting efficiency and torque ratio in the torque converter T. In the torque converter T according to the present embodiment, however, each of the lap gaps g exhibits a large throttling resistance to effectively inhibit such flowing-out and flowing-in of the oil, whereby substantially the entire amount of the oil exiting the turbine impeller 111 is passed through the stator impeller 112 to flow to the pump impeller 110, thereby making it possible to effectively prevent the reductions in transmitting efficiency and torque ratio in the torque converter T, because the core rings 135, 136 and 137 are formed, so that the above-described expression (1), i.e., g/R≦1.0%, is established.

Figure 9:
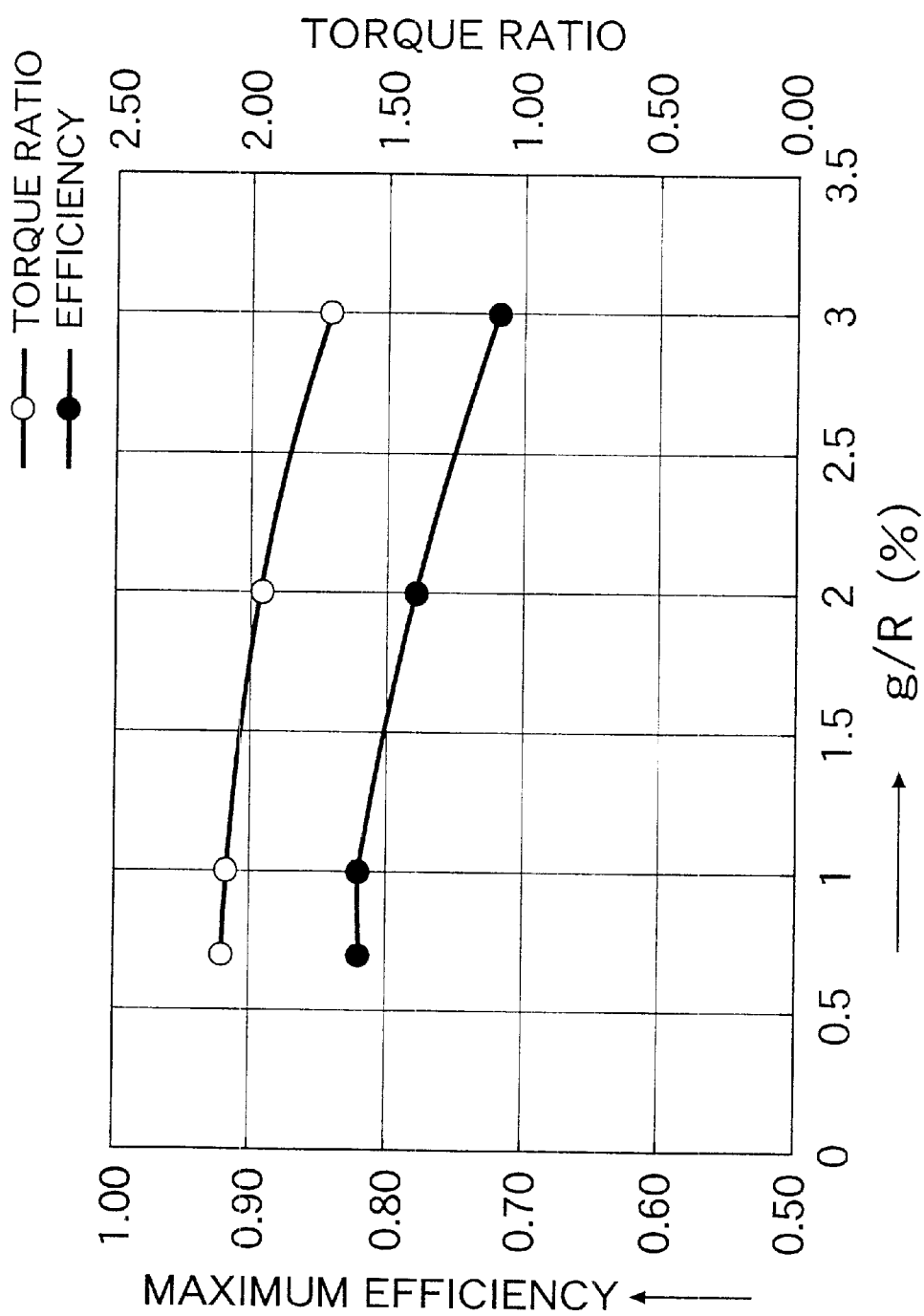
FIG. 9 is a first characteristic diagram for the torque converter according to the second embodiment of the present invention.

FIG. 9 is a diagram showing the relationship between g/R and the maximum transmitting efficiency as well as the torque ratio, which have been determined by a test. As is apparent from FIG. 9, if g/R exceeds 1.0%, both of the maximum transmitting efficiency and the torque ratio are decreased.

To ensure the transmitting efficiency and the torque ratio, g/R may be set at a value equal to or smaller than 1.0%, but if the workability is taken into consideration, it is preferable that g/R is set at approximately 1.0%.

In addition, in the torque converter T according to the present embodiment, the core rings 135, 136 and 137 are formed, so that the above-described expression (2), i.e., A/W≧7.5%, is established, and hence, even in this case, each of the lap gaps g exhibits a large throttling resistance to effectively inhibit the flowing-out and flowing-in of the oil, thereby making it possible to effectively prevent the reductions in transmitting efficiency and torque ratio in the torque converter T.

Figure 10:
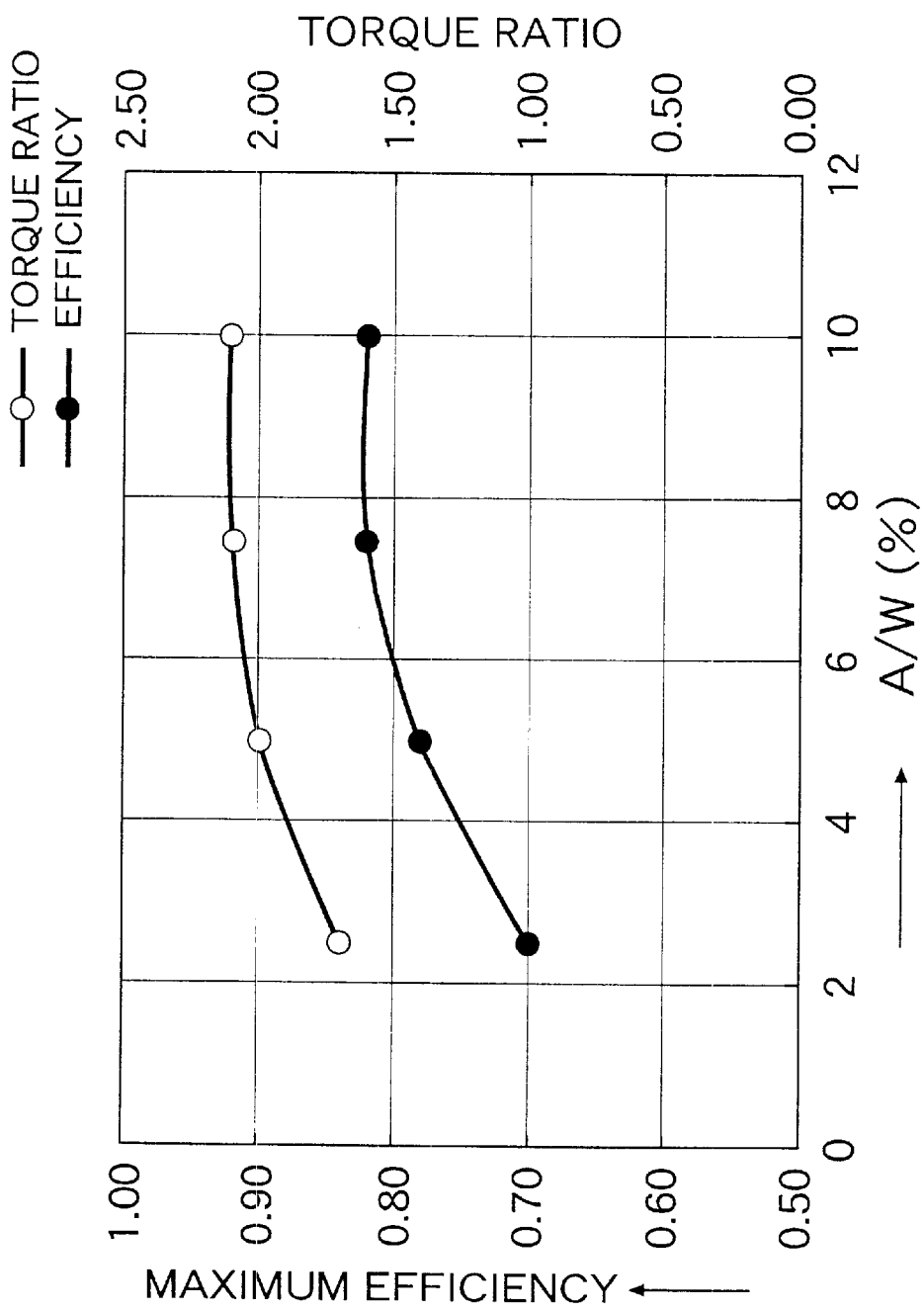
FIG. 10 is a second characteristic diagram for the torque converter.

FIG. 10 is a diagram showing the relationship between A/W and the maximum transmitting efficiency as well as the torque ratio, which have been determined by a test. As is apparent from FIG. 10, if A/W is smaller than 7.5%, both of the maximum transmitting efficiency and the torque ratio are decreased.

Even if either one of the expressions (1) and (2) is only satisfied, it suffices to prevent the reductions in transmitting efficiency and torque ratio in the torque converter T. However, if both of the expressions are satisfied, a further effect can be provided.

When the torque amplifying action has been completed, the stator impeller 112 is rotated in the same direction along with the pump impeller 110 and the turbine impeller 111, while racing the free wheel 118, by the reversion of the torque received by the stator impeller 112.

Figure 6:
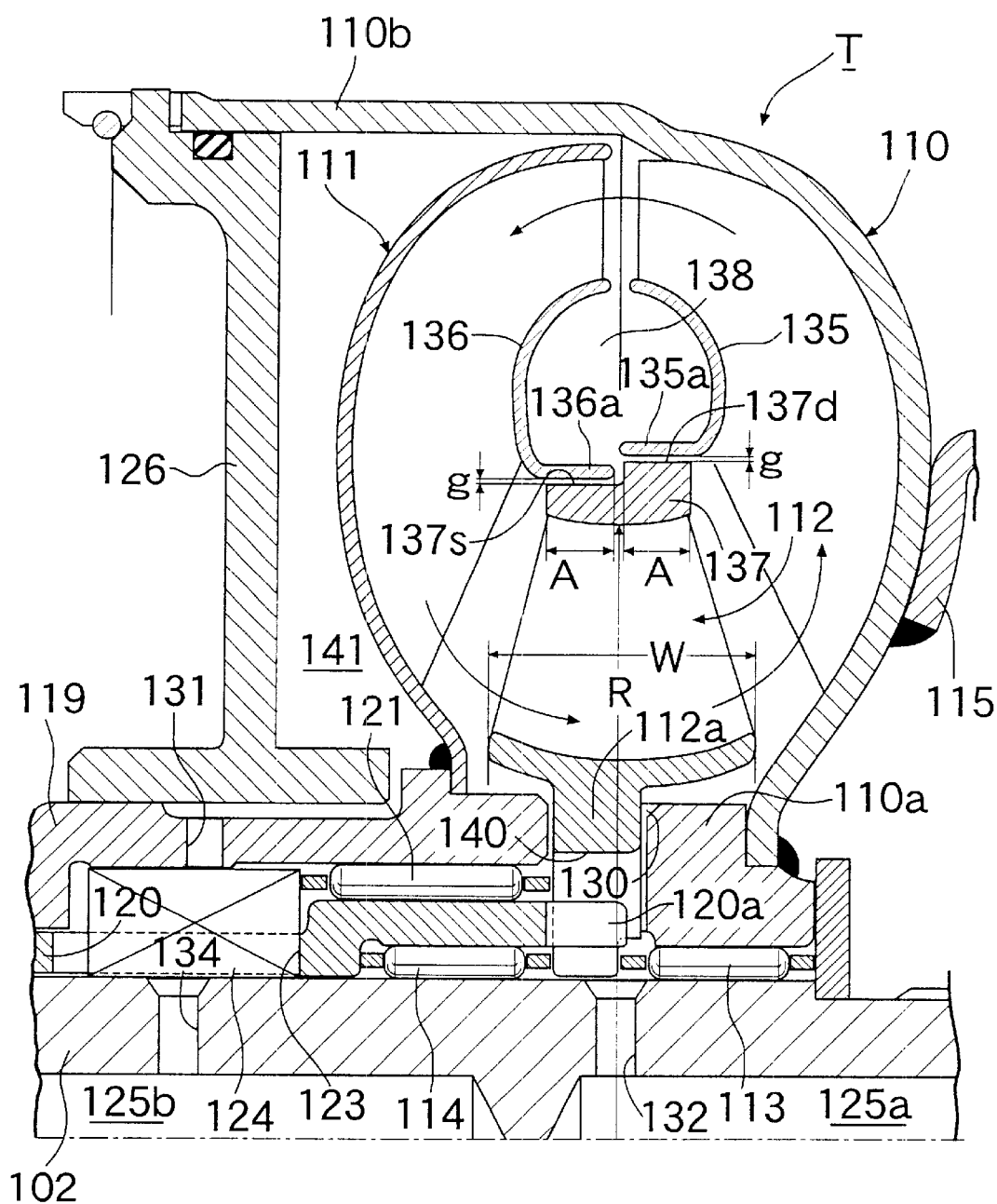
FIG. 6 is an enlarged view similar to FIG. 5, but according to a third embodiment of the present invention.

In a third embodiment shown in FIG. 6, the outer peripheral surface of the core ring 137 of the stator impeller 112 is axially divided into halves. The half on the side of the turbine impeller 111 is formed into a small-diameter outer peripheral surface 137s,and the half on the side of the pump impeller 110 is formed into a large-diameter outer peripheral surface 137d. Inner peripheral ends 135a and 136a of the core rings 135 and 136 of the pump impeller 110 and the turbine impeller 111 are lapped on the large-diameter outer peripheral surface 137d and the small-diameter outer peripheral surface 137s,respectively. The other constructions are the same as in the second embodiment shown in FIGS. 4 and 5 and hence, portions or components corresponding to those in the second embodiment are designated by like reference characters, and the description of them is omitted.

According to the third embodiment, it is easy to set A/W at a large value, and the flowing-out and flowing-in of the oil through the lap gaps g among the core rings 135, 136 and 137 can be inhibited effectively, thereby effectively preventing the reductions in transmitting efficiency and torque ratio in the torque converter T.

Figure 7:
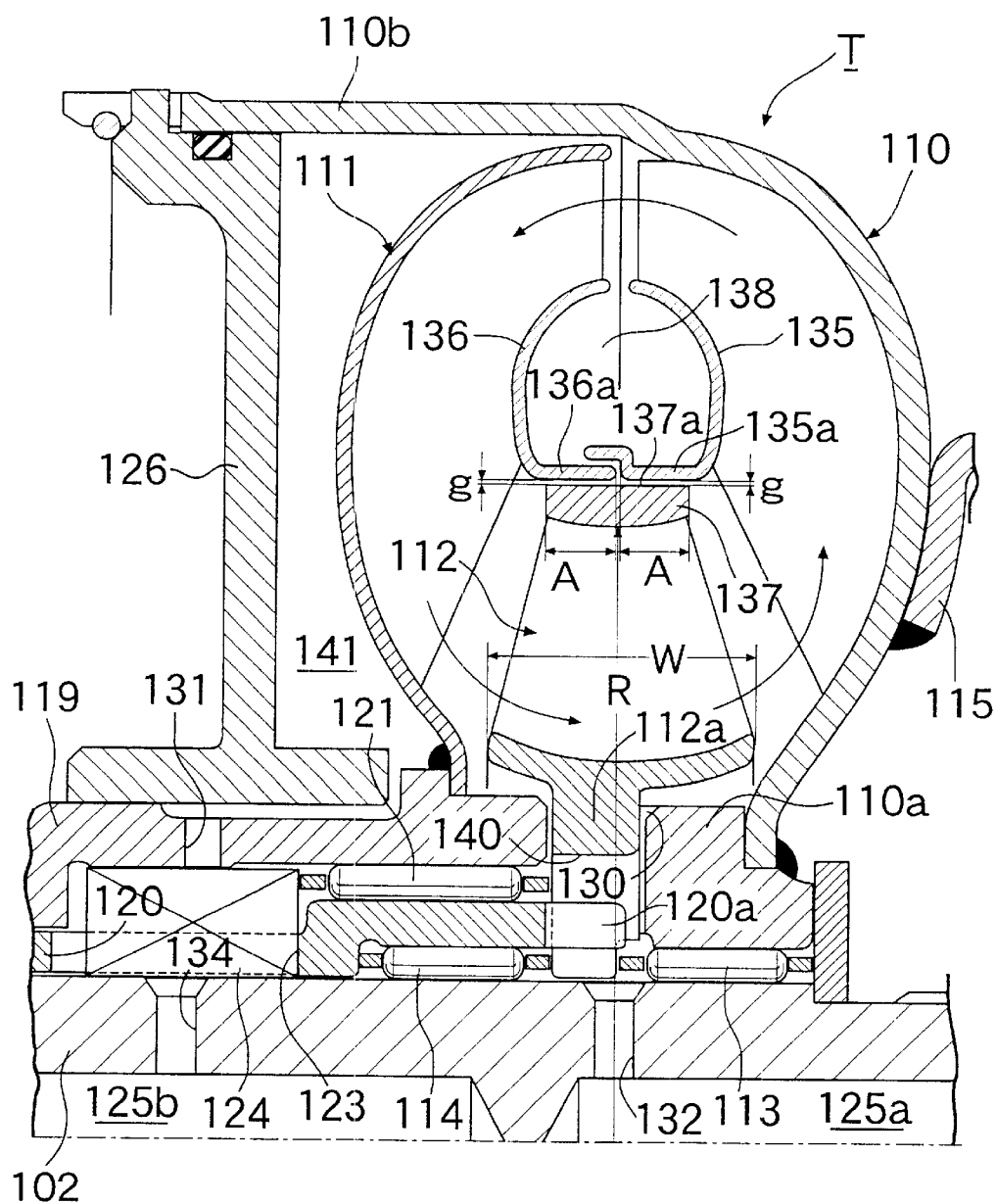
FIG. 7 is an enlarged view similar to FIG. 5, but according to a fourth embodiment of the present invention.

In a fourth embodiment shown in FIG. 7, the outer peripheral surface of the core ring 137 of the stator impeller 112 is formed into a cylindrical shape with a diameter uniform over the entire region. The inner peripheral ends 135a and 136a of the core rings 135 and 136 of the pump impeller 110 and the turbine impeller 111 lapped on the outer peripheral surface of the core ring 137 are disposed, so that they are lapped one on another with the former 136a being on the inner side. The other constructions are the same as in the third embodiment shown in FIG. 6 and hence, portions or components corresponding to those in the third embodiment are designated by like reference characters in FIG. 7, and the description of them is omitted.

According to the fourth embodiment, the flowing-out and flowing-in of the oil through the lap gaps g among the core rings 135, 136 and 137 can be inhibited effectively, thereby effectively preventing the reductions in transmitting efficiency and torque ratio in the torque converter T.

Figure 8:
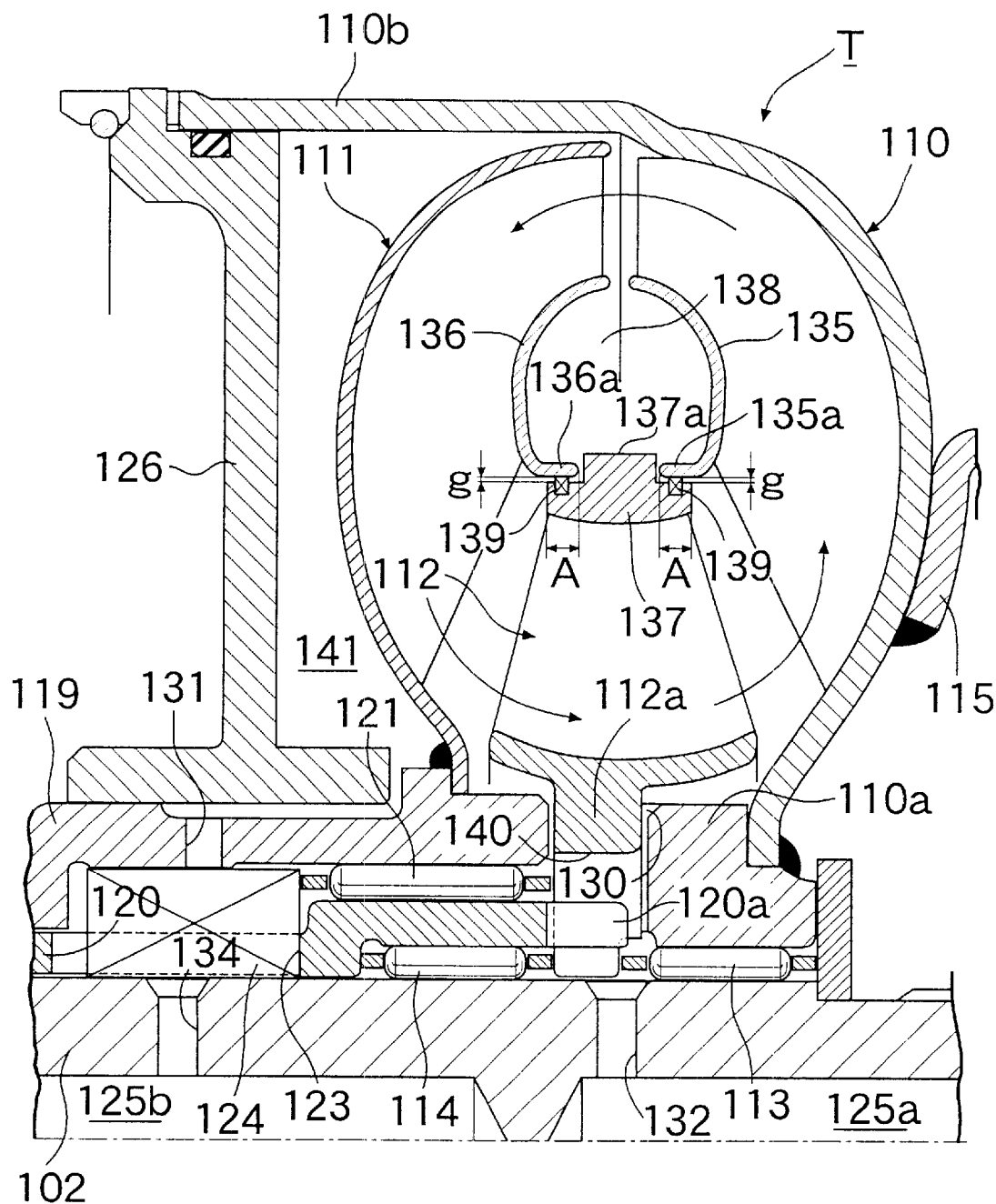
FIG. 8 is an enlarged view similar to FIG. 5, but according to a fifth embodiment of the present invention.

In a fifth embodiment shown in FIG. 8, annular seal members 139, 139 are mounted around the outer periphery of the core ring 137 of the stator impeller 112 to relatively rotatably come into close contact with the inner peripheral ends 135a and 136a of the core rings 135 and 136 of the pump impeller 110 and the turbine impeller 111. The other constructions are the same as in the fourth embodiment shown in FIG. 7 and hence, portions or components corresponding to those in the fourth embodiment are designated by like reference characters in FIG. 8, and the description of them is omitted.

According to the fifth embodiment, the lap gaps g among the core rings 135, 136 and 137 are sealed by the annular seal members 139, 139 and hence, the flowing-out and the flowing-in of the oil through the lap gap g can reliably be inhibited and it is possible to reliably prevent the reductions in transmitting efficiency and torque ratio in the torque converter T.

A sixth embodiment of the present invention shown in FIG. 11 will be described below.

In a torque converter T according to the sixth embodiment, a boss 110a formed at the center portion of the pump impeller 110 is opposed to a right side of a boss 112a formed at the center portion of the stator impeller 112, with a gap g1 left therebetween, and is carried on the crankshaft 102 with a needle bearing 113 interposed therebetween.

A boss 111a fixedly provided at the center portion of the turbine impeller 111 is relatively rotatably carried on the stator shaft 120 with a needle bearing 121 interposed therebetween and opposed to a left end surface of the boss 112a of the stator impeller 112 with a gap g2 left therebetween.

The axial position of the pump impeller 110 is determined by the abutment of an urging plate 142 fixed to an intermediate step 102a of the crankshaft 102 against an outer end surface of the boss 110a,and the axial position of the turbine impeller 111 is determined by the ball bearing 117 carrying the turbine shaft 119. In addition, the axial position of the stator impeller 112 is determined by the sandwiching of the inner periphery end of the boss 112a between the inner races 113a and 114a of the needle bearings 113 and 114. In this case, the gap g2 between the bosses 111a and 112a of the turbine impeller 111 and the stator impeller 112 is set at a small value to the utmost, so that the oil is difficult to flow through the gap g2. To the contrary, the gap g1 between the bosses 110a and 112a of the pump impeller 110 and the stator impeller 112 is set at a sufficiently large value, so that the oil is easy to flow through the gap g1. Thus, the gap g1 serves as the oil inlet 130.

The inlet bore 132 provided in the crankshaft 102 communicates with the oil inlet 130 through the notch 140 of the boss 112a.

An oil outlet 131 is provided in the turbine shaft 119 and connected to the oil chamber 141 behind the turbine impeller 111 and communicates with the traverse bore 123 in the stator shaft 120 and the downstream supply oil passage 125b through the outlet bore 134 provided in the crankshaft 102.

Figure 11:
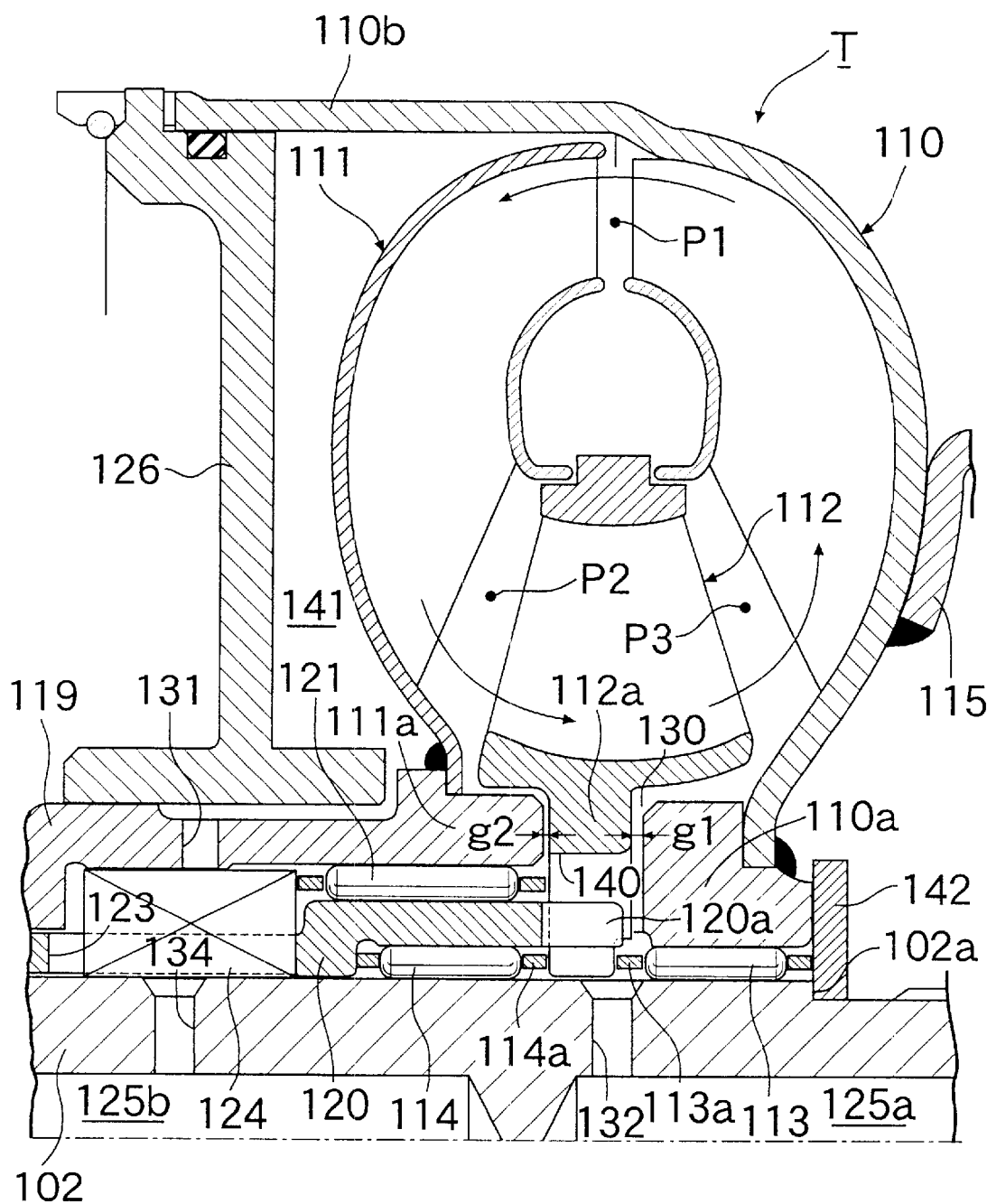
FIG. 11 is an enlarged view similar to FIG. 5, but according to a sixth embodiment of the present invention.

The other constructions are the same as in the second embodiment shown in FIGS. 4 and 5 and hence, portions or components corresponding to those in the second embodiment are designated by like reference characters in FIG. 11, and the description of them is omitted.

The operation of the sixth embodiment of the present invention will be described below.

When the rotation of the crankshaft 102 is transmitted to the pump impeller 110 in the turned-on state of the shifting clutch Cc, the oil in the torque converter T transmits the rotational torque of the pump impeller 110 to the turbine impeller 111, while being circulated within the torque converter T in a course of the pump impeller 110→the turbine impeller 111→the stator impeller 112→the pump impeller 110 by the rotation of the pump impeller 110. If a torque amplifying action has been produced between the pump impeller 110 and the turbine impeller 111 at that time, the resulting reaction force is borne by the stator impeller 112, and the stator impeller 112 is fixedly supported on the crankcase 101 by a locking action of the free wheel 118.

In this case, the pressure of the oil directed from the turbine impeller 111 to the pump impeller 110 is converted into a kinetic energy in the stator impeller 112 and as a result, a relatively large difference in pressure is generated between an inlet and an outlet of the stator impeller 112. The pressure relationship among pressures in various portions of the torque converter T at that time is represented by the following expression:

$$P1 > P2 > P3$$

wherein P1 is a pressure in the outlet of the pump impeller 110; P2 is a pressure in the inlet of the stator impeller 112; and P3 is a pressure in the outlet of the stator impeller 112.

In such a case, even if the pressure discharged from the oil pump 127 is dropped down to near the atmospheric pressure due to a reduction in rotational speed of the engine, the entire amount of the oil discharged by the oil pump 127 is supplied from the oil inlet 130 to the outlet of the stator impeller 112, whereby the drop in pressure P3 in such outlet is suppressed to the utmost, because the gap g2 between the bosses 111a and 112a of the turbine impeller 111 and the stator impeller 112 is throttled sufficiently, and the gap g1 between the pump impeller 110 and the stator impeller 112 is widened to define the oil inlet 130. Therefore, it is possible to prevent the generation of bubbles in the oil in the outlet of the stator impeller 112 to the utmost, thereby previously preventing the reductions in torque ratio and transmitting efficiency due to the generation of bubbles.

In addition, because the gap g2 between the bosses 111a and 112a of the turbine impeller 111 and the stator impeller 112 is throttled sufficiently, it is possible to prevent the oil exiting the turbine impeller 111 from flowing through the gap g2 to the inner periphery of the boss 112a of the stator impeller 112. In addition, the entire amount of the oil exiting the turbine impeller 111 is passed through the stator impeller 112 and hence, it is possible to previously prevent the reductions in torque ratio and transmitting efficiency due to the flowing-out of the oil into the gap g2.

Figure 15:
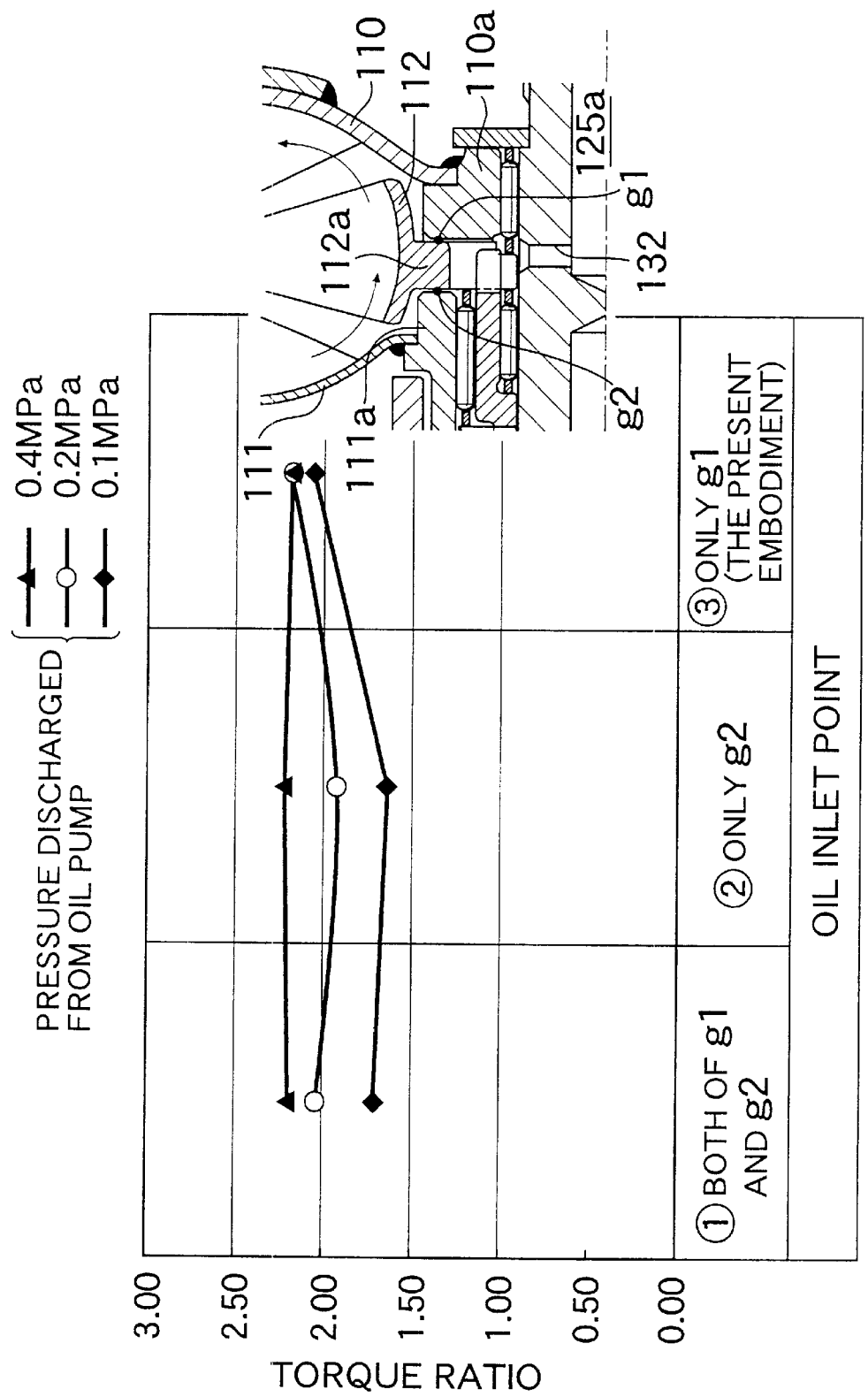
FIG. 15 is a characteristic diagram for the torque converter according to the sixth embodiment of the present invention.

FIG. 15 is a diagram showing the relationship between the position of the oil inlet 130 and the torque ratio determined by a test. In FIG. 15, ① corresponds to a case where the oil inlets 130 are provided in the gaps g1 and g2 on the opposite sides of the boss 112a of the stator impeller 112; ② corresponds to a case where the oil inlet 130 is provided in only the gap g2 on the side of the boss 112a of the stator impeller 112 adjacent the turbine impeller 111, and ③ corresponds to a case where the oil inlet 130 is provided in only the gap g1 on the side of the boss 112a of the stator impeller 112 adjacent the pump impeller 110. As is apparent from FIG. 15, when the pressure discharged from the oil pump 127 was relatively high, a variation in torque ratio was not observed in the cases ①, ② and ③. However, as the discharged pressure was dropped, the torque ratio was decreased in the cases ① and ②, whereas the torque ratio was not decreased in the case ③ (according to the present embodiment).

When the torque amplifying action has been completed, the stator impeller 112 is rotated in the same direction along with the pump impeller 110 and the turbine impeller 111, while racing the free wheel 118, by the reversion of the torque received by the stator impeller 112.

Figure 12:
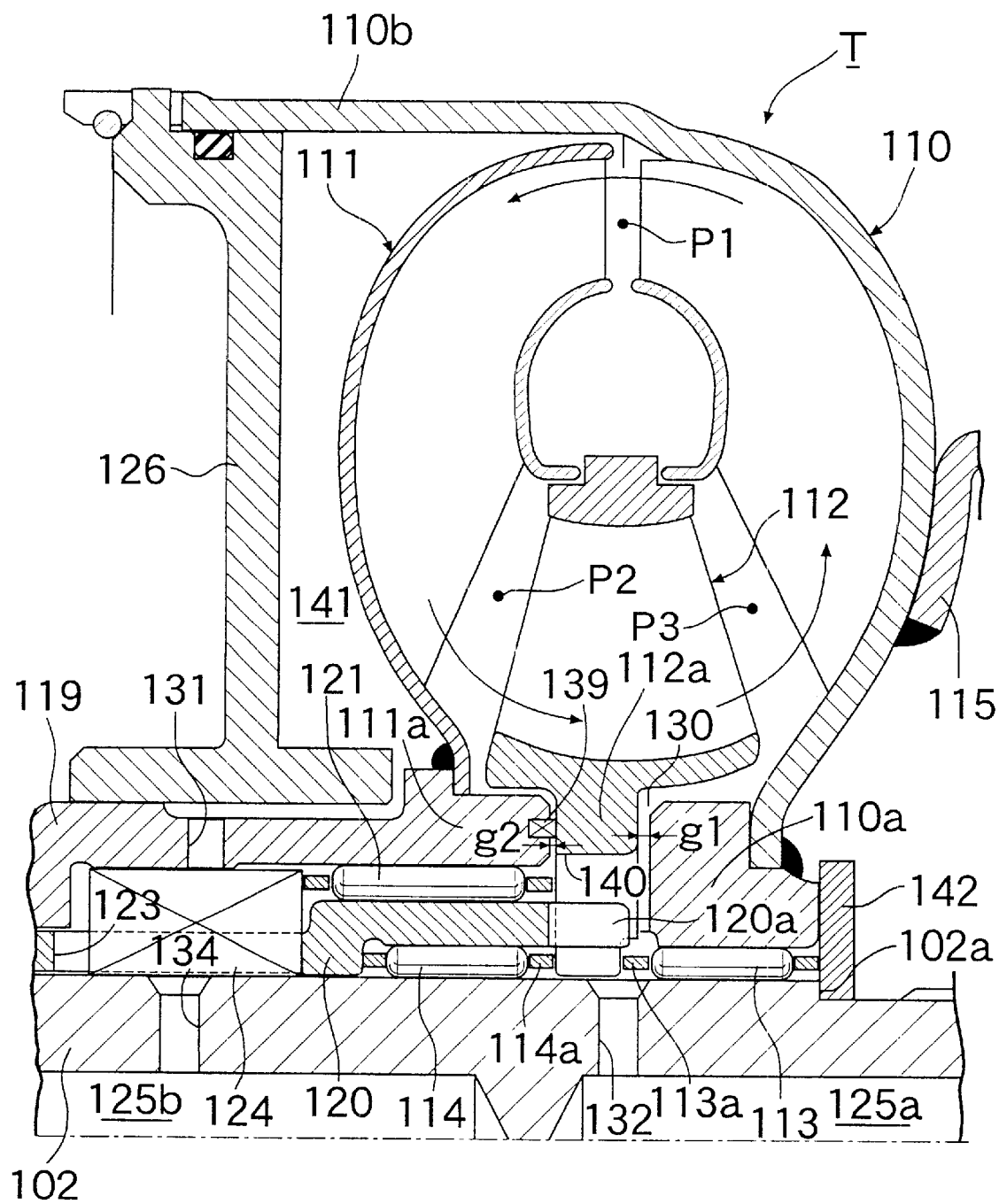
FIG. 12 is an enlarged view similar to FIG. 5, but according to a seventh embodiment of the present invention.

In a seventh embodiment shown in FIG. 12, an annular seal member 139 is interposed between the bosses 111a and 112a of the turbine impeller 111 and the stator impeller 112. The other constructions are the same as in the sixth embodiment shown in FIG. 11 and hence, portions or components corresponding to those in the sixth embodiment are designated by like reference characters in FIG. 12, and the description of them is omitted.

According to the seventh embodiment, the gap g2 between the bosses 111a and 112a of the turbine impeller 111 and the stator impeller 112 is sealed by the seal member 139 and hence, it is possible to reliably inhibit the flowing-out and flowing-in of the oil through the gap g2. Therefore, the entire amount of the oil discharged by the oil pump 127 can be supplied through the oil inlet 130 to the outlet of the stator impeller 112, and the flowing-out of the oil exiting the turbine impeller 111 into the gap g2 can be prevented to effectively prevent the reductions in torque ratio and transmitting efficiency.

Figure 13:
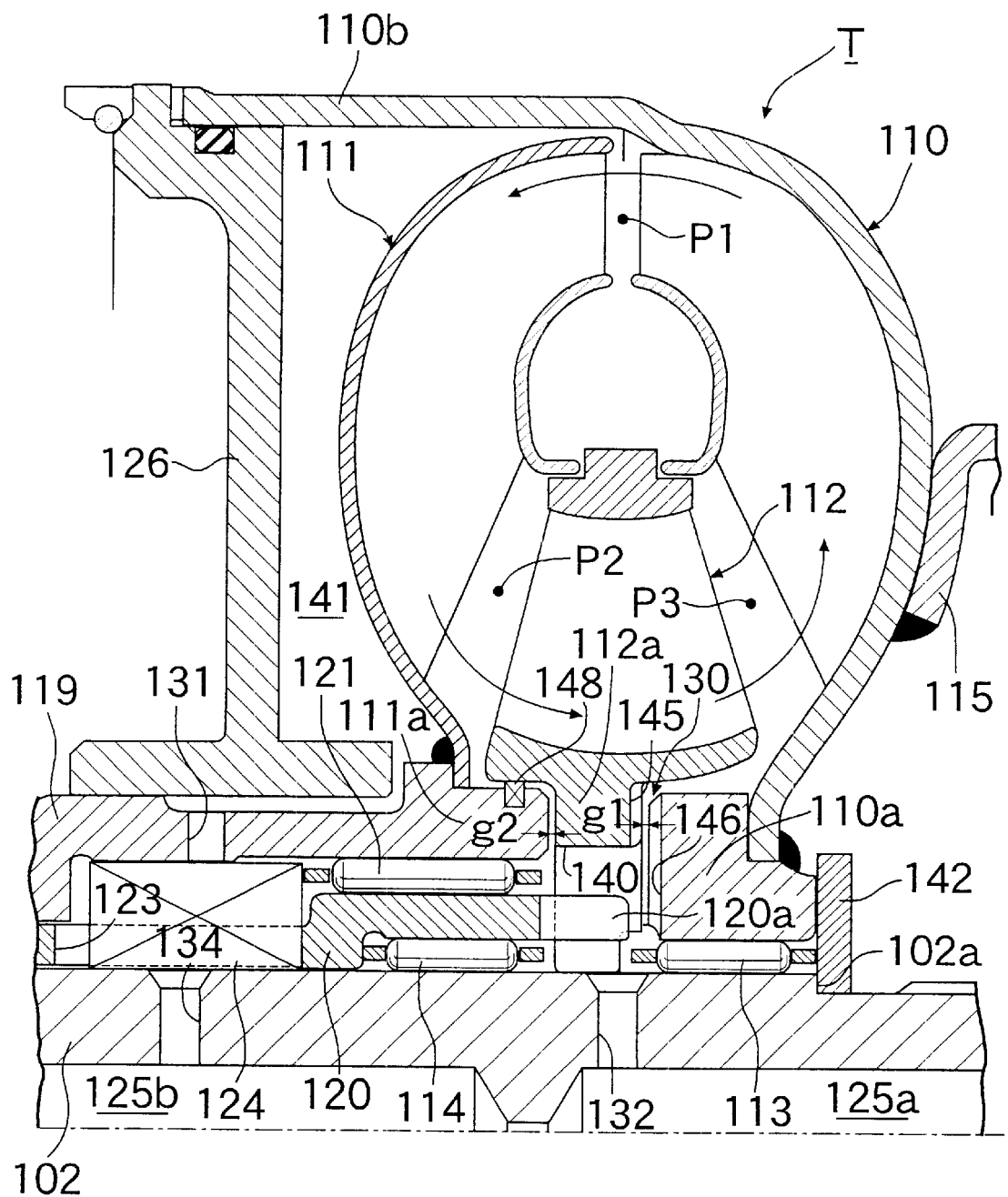
FIG. 13 is an enlarged view similar to FIG. 5, but according to an eighth embodiment of the present invention.

In an eighth embodiment of the present invention shown in FIG. 13, the sizes of the gaps g1 and g2 among the bosses 110a, 111a and 111a are set at small values to the utmost, so that the axial position of the boss 112a of the stator impeller 112 is determined between bosses 110a and 111a of the pump impeller 110 and the turbine impeller 111. A plurality of radial grooves 145 and 146 are provided as oil inlets 130 in one or both of opposed surfaces of the bosses 110a and 112a of the pump impeller 110 and the stator impeller 112 to permit the notch 140 in the boss 112a to communicate with the outlet of the stator impeller 112.

In this case, it is preferably that a gap between the outer peripheral surface of the boss 111a of the turbine impeller 111 and an opposed surface of the stator impeller 112 is narrowed to the utmost, or an annular seal member 148 is interposed between the opposed surfaces of the boss 112a and the stator impeller 112. The other constructions are the same as in the seventh embodiment shown in FIG. 12 and hence, portions or components corresponding to those in the seventh embodiment are designated by like reference characters in FIG. 13, and the description of them is omitted.

According to the eighth embodiment, the function and effect similar to those in the sixth and seventh embodiments can be achieved, and the gaps g1 and g2 among the bosses 110a, 111a and 112a can be narrowed sufficiently to maintain the axial movement of the stator impeller 112 to the minimum.

Figure 14:
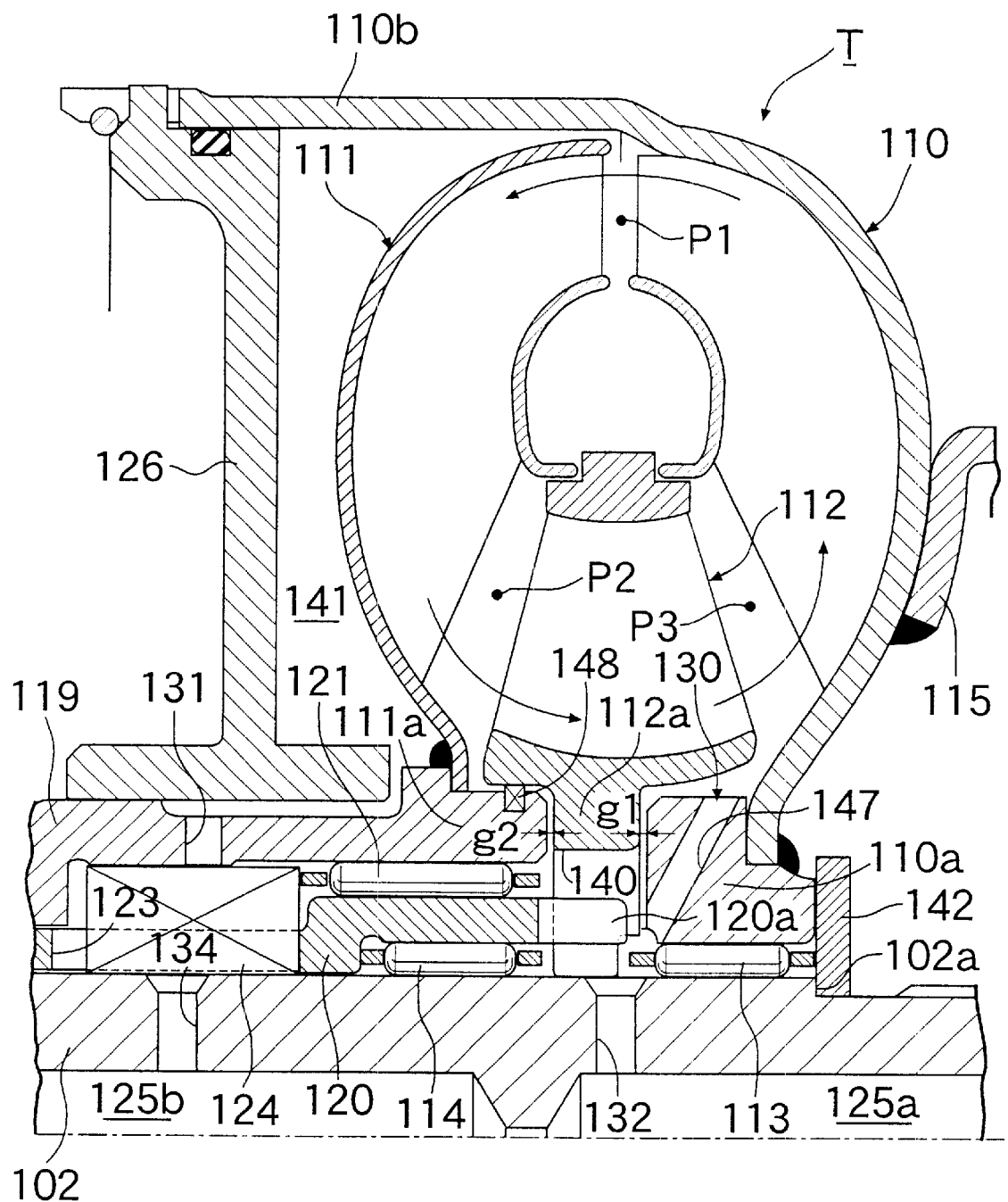
FIG. 14 is an enlarged view similar to FIG. 5, but according to a ninth embodiment of the present invention.

A ninth embodiment of the present invention shown in FIG. 14 is similar in arrangement to the eighth embodiment shown in FIG. 13, except that a through-bore 147 is provided as an oil inlet 130 in the boss 110a of the pump impeller 110 to permit the boss 112a of the stator impeller 112 to communicate with the outlet of the stator impeller 112. Therefore, portions and components corresponding to those in the eighth embodiment are designated by like reference characters in FIG. 14, and the description of them is omitted.

According to the ninth embodiment, the function and effect similar to those in the eighth embodiment can be achieved.

Although the embodiments of the present invention have been described in detail, it will be understood that the present invention is not limited to the above-described embodiments, and various modifications in design may be made without departing from the spirit and scope of the invention defined in claims.

What is claimed is:

1. A torque converter comprising a pump impeller connected to a driving shaft, a turbine impeller connected to a turbine shaft, a stator impeller disposed between said pump impeller and said turbine impeller, and a free wheel which is interposed between said stator impeller and a stationary structure and operable to lock said stator impeller in order to allow said stator impeller to bear a reaction force generated with the amplification of torque between said pump and turbine impellers, wherein a stator shaft connected to said stator impeller is disposed with a tip end thereof being passed through said turbine shaft to protrude outside said turbine shaft, the tip end of said stator shaft being connected to said stationary structure through said free wheel, wherein said turbine impeller is disposed at a location displaced from said pump impeller toward a case carrying said driving shaft; said turbine shaft protruding toward said case is secured to said turbine impeller; said free wheel is interposed between the tip end of said stator shaft passed through said turbine shaft and said case; and said turbine shaft is provided with a driving gear of a primary reducing device, which connects said turbine shaft and an input shaft of a transmission to each other between said turbine impeller and said free wheel.

2. A torque converter according to claim 1, wherein said stator shaft is rotatably carried on said driving shaft, and said free wheel comprises an outer race formed at the tip end of said stator shaft, an inner race rotatably carried on said driving shaft and non-rotatably connected to said case, and a sprag interposed between both of said races.

3. A torque converter according to claim 1, wherein said pump impeller and said turbine impeller have core rings rotatably lapped on a core ring of said stator impeller, and a lap gap (g) between adjacent ones of said core rings and an inner circumferential radius (R) of said core ring of said stator impeller are set to have a relation of (g)/(R) 1.0%.

4. A torque converter according to claim 1, wherein said pump impeller and said turbine impeller have core rings rotatably lapped on a core ring of said stator impeller, and a lap margin (A) between adjacent ones of said core rings and an axial maximum width (W) of said stator impeller are set to have a relation of (A)/(W) 7.5%.

5. A torque converter comprising a pump impeller connected to a driving shaft, a turbine impeller connected to a turbine shaft, a stator impeller disposed between said pump impeller and said turbine impeller, and a free wheel which is interposed between said stator impeller and a stationary structure and operable to lock said stator impeller in order to allow said stator impeller to bear a reaction force generated with the amplification of torque between said pump and turbine impellers, wherein a stator shaft connected to said stator impeller is disposed with a tip end thereof being passed through said turbine shaft to protrude outside said turbine shaft, the tip end of said stator shaft being connected to said stationary structure through said free wheel, wherein said pump impeller has a boss carried on said driving shaft with a first bearing interposed therebetween; said stator shaft leading to a boss of said stator impeller is disposed concentrically around an outer periphery of said driving shaft; said turbine impeller has a boss carried on said stator shaft with a second bearing interposed therebetween, and an operating oil is supplied into an oil chamber defined between said pump impeller and said turbine impeller between said first and second bearings and said first and second bearings are provided with bi-directional seal means for inhibiting the passing of a fluid from any of the inside and outside of said bearings.

6. A torque converter comprising a pump impeller connected to a driving shaft, a turbine impeller connected to a turbine shaft, a stator impeller disposed between said pump impeller and said turbine impeller, and a free wheel which is interposed between said stator impeller and a stationary structure and operable to lock said stator impeller in order to allow said stator impeller to bear a reaction force generated with the amplification of torque between said pump and turbine impellers, wherein a stator shaft connected to said stator impeller is disposed with a tip end thereof being passed through said turbine shaft to protrude outside said turbine shaft, the tip end of said stator shaft being connected to said stationary structure through said free wheel, wherein said pump impeller and said turbine impeller have core rings rotatably lapped on a core ring of said stator impeller, and an annular seal member is interposed between opposed surfaces of adjacent ones of said core rings.

7. A torque converter comprising a pump impeller connected to a driving shaft, a turbine impeller connected to a turbine shaft, a stator impeller disposed between said pump impeller and said turbine impeller, and a free wheel which is interposed between said stator impeller and a stationary structure and operable to lock said stator impeller in order to allow said stator impeller to bear a reaction force generated with the amplification of torque between said pump and turbine impellers, wherein a stator shaft connected to said stator impeller is disposed with a tip end thereof being passed through said turbine shaft to protrude outside said turbine shaft, the tip end of said stator shaft being connected to said stationary structure through said free wheel, wherein said pump impeller and said turbine impeller have bosses opposed to opposite sides of a boss of said stator impeller; a supply oil passage leading to an oil pump is provided to communicate with an inner periphery of said boss of said stator impeller; an oil outlet is provided in an oil chamber defined behind said turbine impeller to communicate between said pump impeller and said turbine impeller; a gap between said bosses of said turbine impeller and said stator impeller is substantially closed; and an oil inlet is provided in at least one of said bosses of said pump impeller and said stator impeller to permit the inner periphery of said boss of said stator impeller to communicate with an outlet of said stator impeller.

8. A torque converter according to claim 7, wherein said oil inlet is comprised of a gap between said bosses of said pump impeller and said stator impeller, which gap is larger than said throttled gap between said bosses of said turbine impeller and said stator impeller.

9. A torque converter according to claim 7, wherein said oil inlet is comprised of a radial groove defined in at least one of opposed surfaces of said bosses of said pump impeller and said stator impeller.

10. A torque converter according to claim 7, wherein said oil inlet is comprised of a through-bore provided in said boss of said pump impeller.

11. A torque converter according to any of claims 7 to 10, further including an annular seal member interposed between opposed surfaces of said boss of said turbine impeller and said stator impeller.

12. A torque converter comprising a pump impeller connected to a driving shaft, a turbine impeller connected to a turbine shaft, a stator impeller disposed between said pump impeller and said turbine impeller, and a free wheel which is interposed between said stator impeller and a stationary structure and operable to lock said stator impeller in order to allow said stator impeller to bear a reaction force generated with the amplification of torque between said pump and turbine impellers, wherein a stator shaft connected to said stator impeller is disposed with a tip end thereof being passed through said turbine shaft to protude outside said turbine shaft, the tip end of said stator shaft being connected to said stationary structure through said free wheel, wherein said stator shaft is rotatably carried on said driving shaft, and said free wheel comprises an outer race formed at the tip end of said stator shaft, an inner race rotatably carried on said driving shaft and non-rotatably connected to said case, and a sprag interposed between both of said races.

* * * * *

UNITED STATES PATENT AND TRADEMARK OFFICE
CERTIFICATE OF CORRECTION

| | | |
|---|---|---|
| PATENT NO. | : 6,487,855 B1 | Page 1 of 1 |
| APPLICATION NO. | : 09/704729 | |
| DATED | : December 3, 2002 | |
| INVENTOR(S) | : Tokuji Yoshimoto et al. | |

It is certified that error appears in the above-identified patent and that said Letters Patent is hereby corrected as shown below:

Col. 19, insert the following symbol in the mathematical equation of claim 3: -- $\leq$ --

3. A torque converter according to claim 1, wherein said pump impeller and said turbine impeller have core rings rotatably lapped on a core ring of said stator impeller, and a lap gap (g) between adjacent ones of said core rings and an inner circumferential radius (R) of said core ring of said stator impeller are set to have a relation of $(g)/(R) \leq 1.0\%$.

Col. 19, insert the following symbol in the mathematical equation of claim 4: -- $\geq$ --

4. A torque converter according to claim 1, wherein said pump impeller and said turbine impeller have core rings rotatably lapped on a core ring of said stator impeller, and a lap margin (A) between adjacent ones of said core rings and an axial maximum width (W) of said stator impeller are set to have a relation of $(A)/(W) \geq 7.5\%$.

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 6,487,855 B1
APPLICATION NO. : 09/704729
DATED : December 3, 2002
INVENTOR(S) : Tokuji Yoshimoto et al.

It is certified that error appears in the above-identified patent and that said Letters Patent is hereby corrected as shown below:

Column 19, lines 29-34 (Claim 3, line 6) insert the following symbol in the mathematical equation: $-- \leq --$.

Should read

3. A torque converter according to claim 1, wherein said pump impeller and said turbine impeller have core rings rotatably lapped on a core ring of said stator impeller, and a lap gap (g) between adjacent ones of said core rings and an inner circumferential radius (R) of said core ring of said stator impeller are set to have a relation of $(g)/(R) \leq 1.0\%$.

Column 19, lines 35-40 (Claim 4, line 6) insert the following symbol in the mathematical equation: $-- \geq --$.

Should read

4. A torque converter according to claim 1, wherein said pump impeller and said turbine impeller have core rings rotatably lapped on a core ring of said stator impeller, and a lap margin (A) between adjacent ones of said core rings and an axial maximum width (W) of said stator impeller are set to have a relation of $(A)/(W) \geq 7.5\%$.

This certificate supersedes the Certificate of Correction issued May 1, 2012.

Signed and Sealed this
Nineteenth Day of June, 2012

David J. Kappos
*Director of the United States Patent and Trademark Office*